(12) United States Patent
Mysur et al.

(10) Patent No.: US 9,197,703 B2
(45) Date of Patent: Nov. 24, 2015

(54) SYSTEM AND METHOD TO MAXIMIZE SERVER RESOURCE UTILIZATION AND PERFORMANCE OF METADATA OPERATIONS

(71) Applicant: HITACHI, LTD., Tokyo (JP)

(72) Inventors: Kaushik Mysur, Singapore (SG); Wujuan Lin, Singapore (SG); Hirokazu Ikeda, Singapore (SG)

(73) Assignee: HITACHI, LTD., Tokyo (JP)

( * ) Notice: Subject to any disclaimer, the term of this patent is extended or adjusted under 35 U.S.C. 154(b) by 215 days.

(21) Appl. No.: 13/924,765

(22) Filed: Jun. 24, 2013

(65) Prior Publication Data
US 2014/0379722 A1    Dec. 25, 2014

(51) Int. Cl.
G06F 17/30 (2006.01)
H04L 29/08 (2006.01)
G06F 3/06 (2006.01)

(52) U.S. Cl.
CPC ............ *H04L 67/1097* (2013.01); *G06F 3/067* (2013.01); *G06F 17/30203* (2013.01)

(58) Field of Classification Search
CPC .................... G06F 17/30707; G06F 17/30203; G06F 3/067; H04L 67/1097
USPC ......................................................... 707/740
See application file for complete search history.

(56) References Cited

U.S. PATENT DOCUMENTS

| | | | |
|---|---|---|---|
| 6,185,601 B1 * | 2/2001 | Wolff | 709/203 |
| 7,617,321 B2 * | 11/2009 | Clark | 709/229 |
| 7,827,192 B2 | 11/2010 | Batterywala | |
| 7,885,970 B2 * | 2/2011 | Lacapra | 707/770 |
| 8,091,089 B2 | 1/2012 | Choi et al. | |
| 8,145,759 B2 | 3/2012 | Bhogi et al. | |
| 8,484,259 B1 * | 7/2013 | Makkar et al. | 707/827 |
| 2003/0078946 A1 * | 4/2003 | Costello et al. | 707/201 |
| 2010/0161585 A1 | 6/2010 | Jin et al. | |
| 2010/0161657 A1 * | 6/2010 | Cha et al. | 707/770 |

OTHER PUBLICATIONS

Wang, Fang, et al., "High Availability Storage System Based on Two-level Metadata Management", FCST 2007, Wuhan, China, Nov. 1-3, 2007, pp. 41-48.*

Yu, Jiongyu, et al., "DMooseFS: Design and Implementation of Distributed Files System with Distributed Metadata Server", APCloudCC 2012, Shenzhen, China, Nov. 14-17, 2012, pp. 42-47.*

(Continued)

*Primary Examiner* — Robert Stevens
(74) *Attorney, Agent, or Firm* — Mattingly & Malur, PC

(57) ABSTRACT

An MDS (metadata server) in a distributed storage system includes data servers (DSs) storing file contents and one or more MDSs performing metadata operations in response to metadata requests of different types, the MDS including a controller having a processor and a memory, the MDS storing file system metadata. The controller is configured to: classify the metadata operations into different categories, which include a normal category and one or more special categories different from the normal category, the normal category having a primary stage which does not involve communication between the MDS and a component external to the MDS; for each special category, partition each metadata operation into a plurality of stages at least one of which involves communication between the MDS and a component external to the MDS; and dynamically assign resources to each of the partitioned stage based on monitored workloads of the different types of metadata requests.

20 Claims, 38 Drawing Sheets

(56) References Cited

OTHER PUBLICATIONS

Wu, Jan-Jan, et al., "Metadata Partitioning for Large-scale Distributed Storage Systems", CLOUD 2010, Miami, FL, Jul. 5-10, 2010, pp. 212-219.*

Brandt, Scott A., et al., "Efficient Metadata Management in Large Distributed Systems", MSST 2003, San Diego, CA, Apr. 7-10, 2003, pp. 290-298.*

The Microsoft Computer Dictionary, 5th Edition, Microsoft Press, Redmond, WA, © 2002, p. 474.*

Yan, Jie, et al., "A Design of Metadata Server Cluster in Large Distributed Object-Based Storage", NASA/IEEE MSST 2004, Adelphi, MD, Apr. 13-16, 2004, 8n pages.*

Xing, Jing, et al., "Adaptive and Scalable Metadata Management to Support a Trillion Files", SC '09, Portland, OR, Nov. 14-20, 2009, Article No. 26, 11 pages.*

\* cited by examiner

| Category name | Metadata operations |
|---|---|
| Normal | getattr<br>lookup<br>access<br>verify<br>setattr (non file size update) |
| Special Type A | open<br>remove (type = file)<br>layoutget<br>layoutcommit<br>read (through-MDS)<br>write (through-MDS)<br>setattr (file size update) |
| Special Type B | All metadata operations on files/directories managed by a second MDS |

Figure 6

| Category | Stage ID | List of stages | | Processing time | |
|---|---|---|---|---|---|
| Normal | 1 | Primary metadata processor | [0710] | t1 | [0711] |
| Special Type A | 1 | Primary metadata processor | | t1 | |
| | A2 | pNFS manager | [0720] | At2 | [0721] |
| | A3 | MDS-DS asynchronous client | [0730] | At3 | [0731] |
| | A4 | Asynchronous DS processing | [0740] | DSt4 | [0741] |
| | A5 | DS response aggregator | [0750] | At5 | [0751] |
| | 6 | Secondary metadata processor | | t6 | |
| Special Type B | 1 | Primary metadata processor | | t1 | |
| | B2 | MDSC manager | [0760] | Bt2 | [0761] |
| | B3 | Inter-MDS asynchronous client | [0770] | Bt3 | [0771] |
| | B4 | Asynchronous inter-MDS processing | [0780] | MDSt4 | [0781] |
| | B5 | MDS response aggregator | [0790] | Bt5 | [0791] |
| | 6 | Secondary metadata processor | [07A0] | t6 | [07A1] |

| Metadata operation | NFSV4.1 compounded list of operations |
|---|---|
| 0810 Get attributes | SEQUENCE, PUTFH, GETATTR |
| 0820 File creation | SEQUENCE, PUTFH, SAVEFH, OPEN (FILE, CREAT), GETFH, GETATTR, RESTOREFH, GETATTR |
| 0830 Directory creation | SEQUENCE, PUTFH, SAVEFH, OPEN (DIR, CREAT), GETFH, GETATTR, RESTOREFH, GETATTR |
| 0840 Get file layout | SEQUENCE, PUTFH, LAYOUTGET |
| 0850 Get file attributes (Files managed by other MDSs) | SEQUENCE, PUTFH, GETATTR |

Figure 8

| Metadata operation category | Number of operations |
|---|---|
| Normal | a |
| Special type A | b |
| Special type B | c |

Figure 23

| Metadata operation category | Workload percentage |
|---|---|
| Normal | 40 |
| Special type A | 30 |
| Special type B | 30 |

2710  2720

Total number of threads allocated to MDS (0110) = 100

2730

| Processing stage | Processing time | Thread allocation |
|---|---|---|
| Primary metadata processor | 1 | 100*0.4 + 100*(0.3*1/6) + 100*(0.3*1/6) = 50 |
| pNFS manager | 1 | 100*(0.3*1/6) = 5 |
| MDS-DS asynchronous client | 2 | 100*(0.3*2/6) = 10 |
| DS response aggregator | 1 | 100*(0.3*1/6) = 5 |
| MDSC manager | 1 | 100*(0.3*1/6) = 5 |
| Inter-MDS asynchronous client | 2 | 100*(0.3*2/6) = 10 |
| MDS response aggregator | 1 | 100*(0.3*1/6) = 5 |
| Secondary metadata processor | 1 | 100*(0.3*1/6) + 100*(0.3*1/6) = 10 |

| Metadata operation category | Special category metadata operation | Number of operations |
|---|---|---|
| Normal | All | a |
| Special type A | All | b |
| Special type B | All | c |
| Special type A | File creation [0820] | d |
| Special type B | Directory creation [0830] | e |
| Special type A | Get file layout [0840] | f |
| Special type B | Get file attributes [0850] | g |

Figure 36

SYSTEM AND METHOD TO MAXIMIZE SERVER RESOURCE UTILIZATION AND PERFORMANCE OF METADATA OPERATIONS

BACKGROUND OF THE INVENTION

The present invention relates generally to storage systems and, more particularly, to system and method to maximize server resource utilization and performance of metadata operations.

Distributed file systems and parallel file systems involve a plurality of servers cooperating with each other in order to complete the processing of file system requests from clients.

In one consideration, a parallel file system such as pNFS (parallel network file system) includes a plurality of Data Servers (DSs) to process read/write requests while a dedicated Metadata Server (MDS) processes all metadata requests. A client first establishes connection to the MDS. Then it performs a file open operation on the interested file to obtain the location information such as IP address of the DS, file identifier on the DS, etc. After knowing the location information and the identifier, the client sends read/write requests directly to the DS. It is the MDS's responsibility to obtain file identifiers from all the DSs as part of the operations such as file open and file create. Hence for certain metadata operations, there is a need for MDS-to-DS communication typically called the Control Path Protocol (CPP). While processing such operations, existing systems block the thread servicing an operation during the CPP procedure, and hence the resources (e.g., CPU, memory, etc.) assigned to the thread cannot be utilized to service other operations. This leads to under-utilization of MDS resources and thereby reduces the overall metadata access performance by a single MDS.

Although separating metadata and read/write service capabilities to MDS and DS respectively greatly improves read/write performance by providing high throughput parallel I/O (HPC applications and streaming applications leverage such architectures), a typical HPC workload contains more than 50% of metadata operations. Hence, MDS server performance is critical in improving overall file system performance as seen by the clients. Virtualized multiple metadata server cluster solutions have been proposed to provide distributed metadata service to increase overall metadata access performance. However, even in such a solution, each MDS is underutilized during CPP communication. Thus, there is a need to provide a solution to effectively utilize MDS resources during CPP communication.

In another consideration, multiple MDS solutions which provide global namespace and a virtualized view of MDSs need MDS-to-MDS communication for certain metadata requests such as directory create and directory listing. As an illustration, in some multiple MDS solution where metadata distribution is at the directory level, a create directory operation may need to create the directory at another MDS other than the one receiving the create directory request. During such MDS-to-MDS communication, threads block as aforementioned and leads to underutilization of MDS resources.

BRIEF SUMMARY OF THE INVENTION

Exemplary embodiments of the invention provide a solution to effectively utilize MDS resources for metadata operations requiring server-to-server communication, including the aforementioned CPP communication and MDS-to-MDS communication. In general, a solution which can improve metadata server resource utilization during any server-to-server communication is desired. Specific embodiments are directed to a method to maximize server resource utilization and performance of metadata operations by classifying the metadata operation into different categories (normal category and plurality of special categories) and partitioning the metadata server program into a plurality of stages for special categories of metadata operations and dynamically assigning resources to each of the partitioned stage based on the monitored client workload of various metadata request categories.

Existing solutions can be classified into two categories. The first approach is to reduce the server-to-server traffic and the second approach is to maximize utilization of server resources by resource management strategies.

In the first approach, the server-to-server traffic is avoided for metadata operations by either a prefetching technique or by a caching technique. US2010/0161585 uses a prefetching technique to reduce MDS-to-DS (CPP) communication during file creation. In this technique, data server resources are created and all resource information required to identify the file are pre-fetched and stored in the MDS. When the client requests for file creation, the MDS uses one of the pre-allocated data server resources and maps that resource to the requested file creation. This avoids the CPP communication during file creation and hence improves file creation performance. However, such a technique only caters to file creation performance but MDS resources are underutilized during other metadata operations involving CPP communication such as file open, file close, file remove etc. U.S. Pat. No. 7,827,192 uses a caching technique to reduce CPP communication. For metadata operations requiring CPP communication, the MDS uses the cached data server resource information and avoids the actual CPP communication. However, such techniques are only suitable for read-only metadata operations but cannot solve underutilization problem during update or create metadata operations. Similar caching techniques have been proposed to reduce other server-to-server traffic such as MDS-to-MDS but they only improve performance for read-only requests.

Using the second approach, the metadata resources are utilized efficiently by using resource management techniques using information collected by monitoring current resource utilization and/or client workload. U.S. Pat. No. 8,091,089 monitors resource utilization of multiple instances of metadata server programs running on a single machine and manages resource allocation among those instances efficiently. For example, if one instance of metadata server program is underutilizing its resources, the resource management program de-allocates underutilized resources and assigns it to other instances of metadata server program which are using their currently assigned resources to the limit. U.S. Pat. No. 8,145,759 performs similar resource management technique to effectively assign resources to different applications running on the server. In this technique, the number of client requests to each server application is monitored. Upon receiving a configuration change request for an application, the resource management program increases or decreases server resources dedicated to that application based on the current assignment, current number of client requests, and new resource limit. Such resource management techniques effectively reduce underutilization of server resources by dynamically managing resources across different instances of the program. However, they do not consider different categories of client requests for the same server program and do not allocate resources to different stages of the same server program which is critical to solve the identified problem (because processing time for different metadata operations vary significantly due to server-to-server communication required for some of those operations).

This invention can be used to design metadata servers to improve/maximize MDS resources utilization and thereby increasing metadata access performance. In specific examples, the invention can be used to design metadata servers on dedicated physical machine such as those in asymmetric architecture (e.g., pNFS), or to design metadata server program on symmetric distributed file system and symmetric clusters.

An aspect of the present invention is directed to an MDS (metadata server) in a distributed storage system which includes a plurality of data servers (DSs) storing file contents and one or more MDSs performing a plurality of metadata operations in response to metadata requests of different types, the MDS including a controller having a processor and a memory, the MDS storing file system metadata. The controller is configured to: classify the metadata operations into different categories, which include a normal category and one or more special categories which are different from the normal category, the normal category having a primary stage which does not involve communication between the MDS and a component external to the MDS; for each of the one or more special categories, partition each of the metadata operations into a plurality of stages at least one of which involves communication between the MDS and a component external to the MDS; and dynamically assign resources to each of the partitioned stage based on monitored workloads of the different types of metadata requests.

In some embodiments, the classifying comprises classifying the metadata operations into different categories based on type and amount of processing required for each category. The one or more special categories of metadata operations comprise at least one of (i) a first special category of metadata operations that require communication between the MDS and one or more of the plurality of DSs; or (ii) a second special category of metadata operations that require communication between the MDS and one or more other MDSs. The stages for the first special category of metadata operations comprise the primary stage; and a pNFS manager stage for performing pNFS related metadata management including preparing requests to be sent to the DSs; an MDS-DS asynchronous client stage for sending asynchronous requests to the DSs; an asynchronous DS processing stage which is performed on the DSs for processing asynchronous requests from the MDS and sending a response back to the MDS after processing completes; a DS response aggregator stage for receiving responses from the DSs and aggregating all the received responses to a single context representing a corresponding metadata operation; and a secondary metadata processor stage for post processing on the MDS. The stages for the second special category of metadata operations comprise the primary stage; and an MDSC manager stage for performing MDS cluster management including preparing requests to be sent to the one or more other MDSs; an inter-MDS asynchronous client stage for sending asynchronous requests to the one or more other MDSs; an asynchronous inter-MDS processing stage which is performed on the one or more other MDSs; an MDS response aggregator stage for receiving responses from the plurality of MDSs and aggregating all the received responses to a single context representing a corresponding metadata operation; a secondary metadata processor for post processing on the MDS.

In specific embodiments, the partitioning comprises partitioning each metadata operation into a plurality of stages each of which (i) involves communication with a component external to the MDS, or (ii) involves a processing logic that is modularly different from its preceding processing logic and its succeeding processing logic. A stage which involves communication with a component external to the MDS has a processing logic that treats the external component with which the stage of the metadata operation communicates as an asynchronous server component.

In some embodiments, the dynamically assigning resources comprises: monitoring metadata workload of the normal category and the one or more special categories to obtain a number of metadata operations for each category and a total number of metadata operations for all categories; calculating, for each special category, a ratio of the number of metadata operations for said each special category to the total number of metadata operations for all categories obtained from the monitoring; calculating a processing time for each of the normal category and the one or more special categories; and allocating a plurality of threads representing units of execution across all the stages by considering: (i) an estimated processing time for each stage, (ii) the calculated ratio for each special category, (iii) the calculated processing time for each category, and (iv) a total number of threads allocated to the MDS. The threads allocated to a particular special category are assigned to each stage involved in the particular special category in the ratio of the estimated processing time of each stage relative to the processing time of all the stages of the particular special category.

In specific embodiments, the controller is configured to identify, from the one or more special categories of metadata operations, one or more candidate metadata operations to be executed in batch mode. The one or more candidate metadata operations each (i) has a potential to be batched together in a single network call to perform similar metadata operations speculatively, or (ii) has a potential to be locally completed asynchronously within the MDS and, at a later point in time, to be batched together with similar metadata operations to complete inter-server processing between the MDS and one or more external components.

In some embodiments, the controller is configured: (i) when the one or more candidate metadata operations each has a potential to be batched together in a single network call to perform similar metadata operations speculatively, to identify data structures required to be stored in the memory of the MDS in order to perform a batch operation to speculatively fetch information from the external component; or (ii) when the one or more candidate metadata operations each has a potential to be locally completed asynchronously within the MDS and, at a later point in time, to be batched together with similar metadata operations to complete inter-server processing between the MDS and one or more external components, to identify a data consistency protocol for batch mode execution involving asynchronous processing.

In specific embodiments, the controller is configured to: count a total number of each candidate metadata operation to be executed in batch mode based on monitoring the metadata workload; and when the total number of a particular candidate metadata operation exceeds a preset threshold for the particular candidate metadata operation, select the particular candidate metadata operation to be executed in batch mode. The dynamically assigning resources comprises: monitoring metadata workload of the normal category and the one or more special categories to obtain a number of metadata operations for each category and a total number of metadata operations for all categories; calculating, for each special category, a ratio of (the number of metadata operations for said each special category minus a number of metadata operations for said each special category which have been selected to be executed in batch mode) to the total number of metadata operations for all categories obtained from the monitoring; calculating a processing time for each of the normal category and the one or more special categories; and allocating a plurality of threads representing units of execution across all the stages by considering: (i) an estimated processing time for each stage, (ii) the calculated ratio for each special category, (iii) the calculated processing time for each category, and (iv) a total number of threads allocated to the MDS.

Another aspect of the invention is directed to a method of managing resources of an MDS (metadata server) in a distributed storage system which includes a plurality of data servers (DSs) storing file contents and one or more MDSs performing a plurality of metadata operations in response to metadata requests of different types, the MDS including a controller having a processor and a memory, the MDS storing file system metadata. The method comprises: classifying the metadata operations into different categories, which include a normal category and one or more special categories which are different from the normal category, the normal category having a primary stage which does not involve communication between the MDS and a component external to the MDS; for each of the one or more special categories, partitioning each of the metadata operations into a plurality of stages at least one of which involves communication between the MDS and a component external to the MDS; and dynamically assigning resources to each of the partitioned stage based on monitored workloads of the different types of metadata requests.

These and other features and advantages of the present invention will become apparent to those of ordinary skill in the art in view of the following detailed description of the specific embodiments.

BRIEF DESCRIPTION OF THE DRAWINGS

FIG. 6 illustrates an exemplary metadata operation classification table which contains a classified list of metadata operations for NFSV4.1 protocol.

FIG. 7 depicts an exemplary workload distribution table.

FIG. 8 is a table illustrating an exemplary list of metadata operations and for each metadata operation a corresponding list of compound operations which are part of NFSV4.1 specification.

FIG. 23 illustrates an exemplary workload information table according to the first embodiment.

FIG. 27 illustrates an exemplary instance of the thread allocation algorithm provided in FIG. 26.

FIG. 36 illustrates a modified workload information table according to the second embodiment.

DETAILED DESCRIPTION OF THE INVENTION

Figure 1:
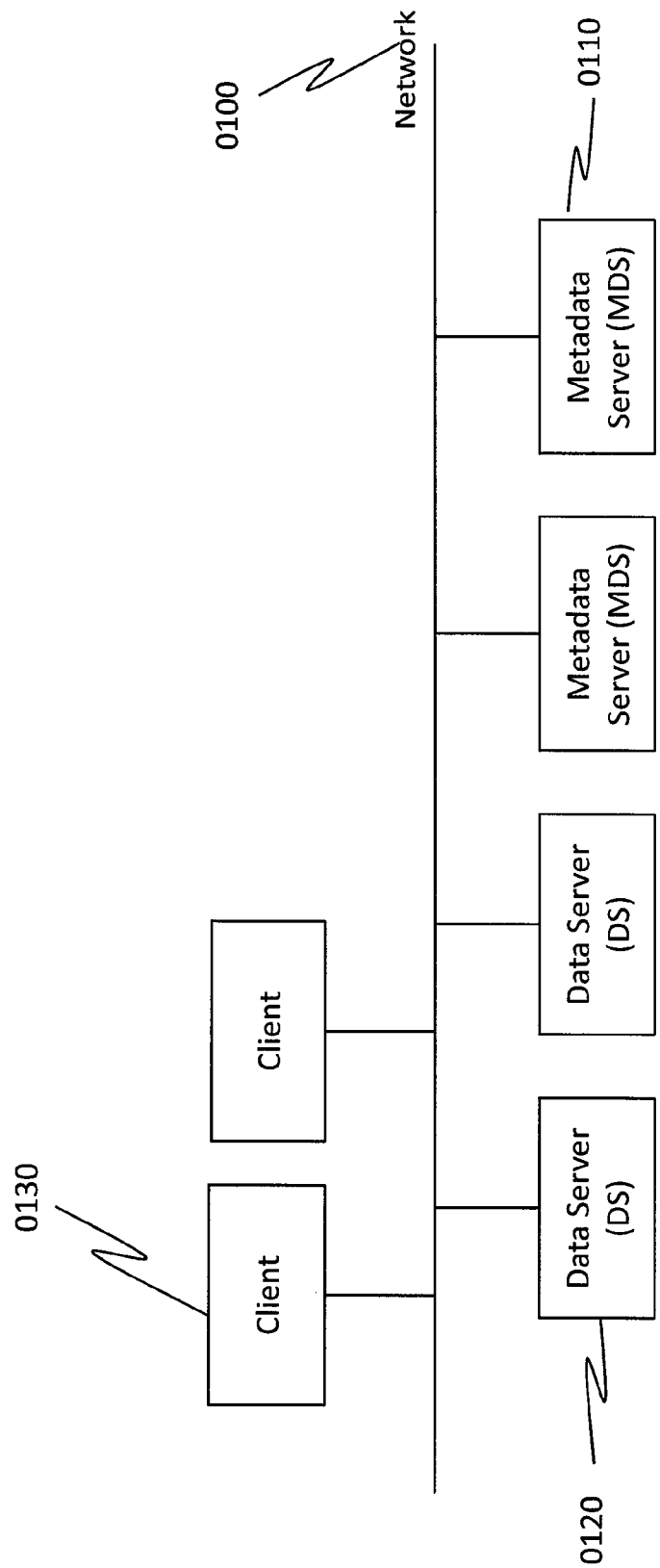
FIG. 1 is an exemplary diagram of an overall system in which the method and apparatus of the invention may be applied according to the first embodiment of the invention.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium including non-transient medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for improving server resource utilization and performance of metadata operations.

Embodiment 1

FIG. 1 is an exemplary diagram of an overall system in which the method and apparatus of the invention may be applied according to the first embodiment of the invention. The system includes a plurality of Metadata Servers (MDSs) 0110, Data Servers (DSs) 0120, and clients 0130 connected to a network 0100. An example of the network is Local Area Network.

MDSs 0110 are servers or devices which manage the namespace of the file system, contain metadata of the files and directories, and provide service to metadata operations initiated by clients 0130. In addition, MDSs 0110 may communicate with other MDSs 0110 or DSs 0120 for the following reasons. MDSs 0110 communicate with DSs 0120 in order to map the files in the namespace with the physical data present in DSs 0120. Such information is used to process some metadata operations initiated by clients 0130. MDSs 0110 may communicate with other MDSs 0110 to provide a global namespace while processing some metadata operations initiated by the client 0130.

DSs 0120 are servers or devices which store data or file contents. DSs 0120 process requests (mainly Read and Write)

from clients 0130. DSs 0120 also process requests from MDSs 0110 to provide details and location of the file contents on DSs 0120.

Clients 0130 are devices (such as PCs or other application servers) which have network file system client program. Clients 0130 communicate with MDSs 0110 to access, modify file system namespace, and obtain metadata information (including location of DSs and identifiers of files or data on DSs 0120). Clients 0130 communicate with DSs 0120 to read and write data or file contents.

Figure 2:
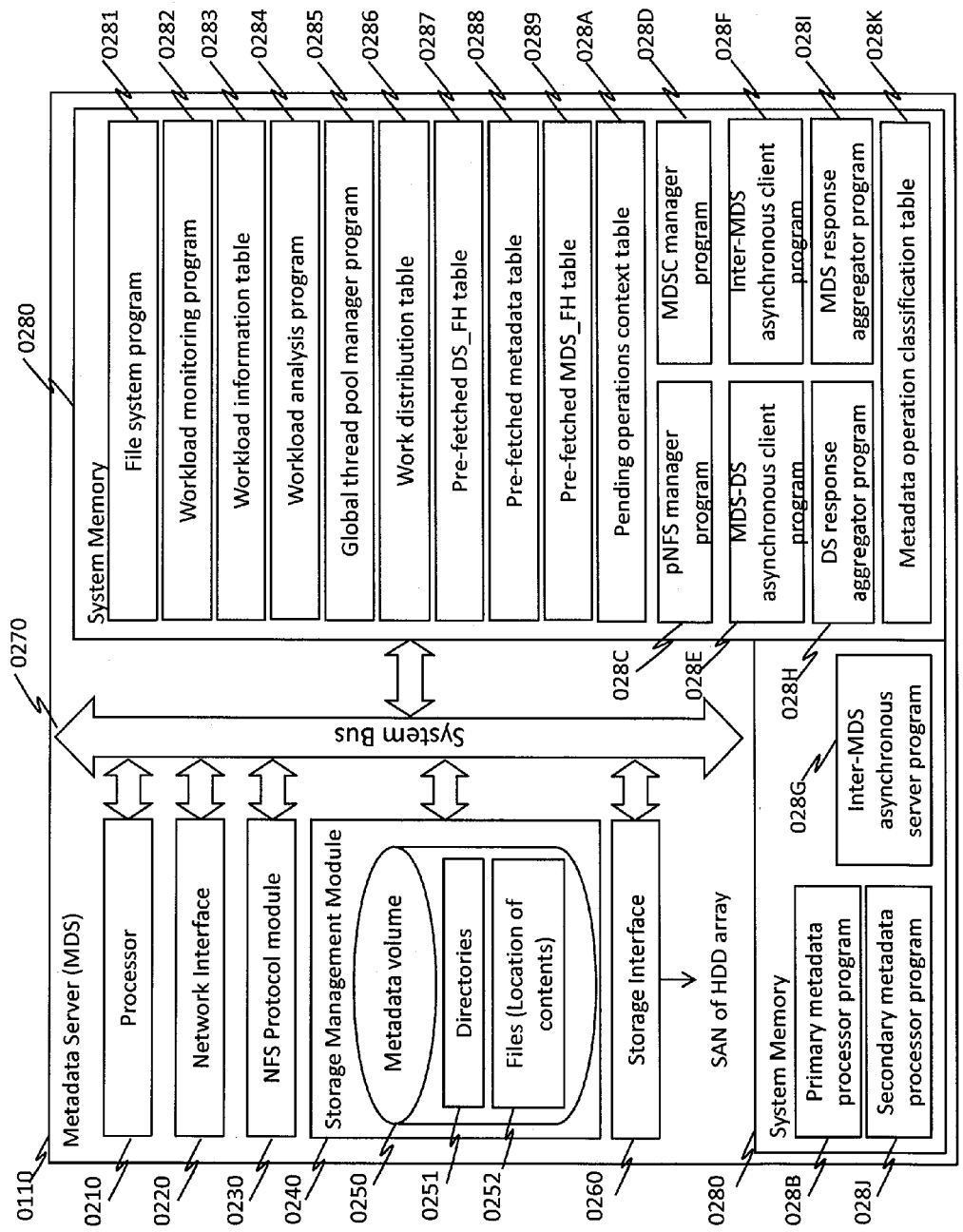
FIG. 2 is a block diagram illustrating the components of an MDS.

FIG. 2 is a block diagram illustrating the components of an MDS. The MDS 0110 may include, but is not limited to, a processor 0210, a network interface 0220, an NFS (Network File System such as NFSV4.1 or above) protocol module 0230, a storage management module 0240, a metadata volume 0250, a storage interface 0260, a system bus 0270, and a system memory 0280. The system memory 0280 may include, but is not limited to, a file system program 0281, a workload monitoring program 0282, a workload information table 0283, a workload analysis program 0284, a global thread-pool manager program 0285, a work distribution table 0286, a pre-fetched DS_FH table 0287, a pre-fetched metadata table 0288, a pre-fetched MDS_FH table 0289, a pending operation context table 028A, a primary metadata processor program 028B, a pNFS (parallel Network File System) manager program 028C, an MDSC (Metadata Server Cluster) manager program 028D, a MDS-DS asynchronous client program 028E, an inter-MDS asynchronous client program 028F, an inter-MDS asynchronous server program 028G, a DS response aggregator program 028H, an MDS response aggregator program 028I, a secondary metadata processor program 028J, and a metadata operation classification table 028K.

The processor 0210 represents a central processing unit that executes computer programs. The NFS protocol module 0230 is responsible for both client and server functionality of NFS protocol (such as NFSV4.1). As a client, NFS protocol module 0230 sends requests to DSs 0120 and, as a server, provides service to metadata operations initiated from clients 0130. The network interface 0220 connects the MDS 0110 to the network 0100 for communication with DSs 0120 and clients 0130. The workload information table 0283, the pre-fetched DS_FH table 0287, the pre-fetched metadata table 0288, and the pre-fetched MDS_FH table 0289 are read and written to by the programs in system memory 0280. The storage interface 0260 connects the storage management module 0240 to a storage device over the storage area network (SAN) or to an internal hard disk drive (HDD) for raw data storage. The storage management module 0240 organizes raw data onto a metadata volume 0250 which contains directories 0251 and files 0252 (representing file metadata and location of file contents). The directories 0251 and files 0252 are read and written to by file system program 0281. Commands and data are communicated between the processor 0210 and other components of the MDS 0110 over a system bus 0270.

Figure 3:
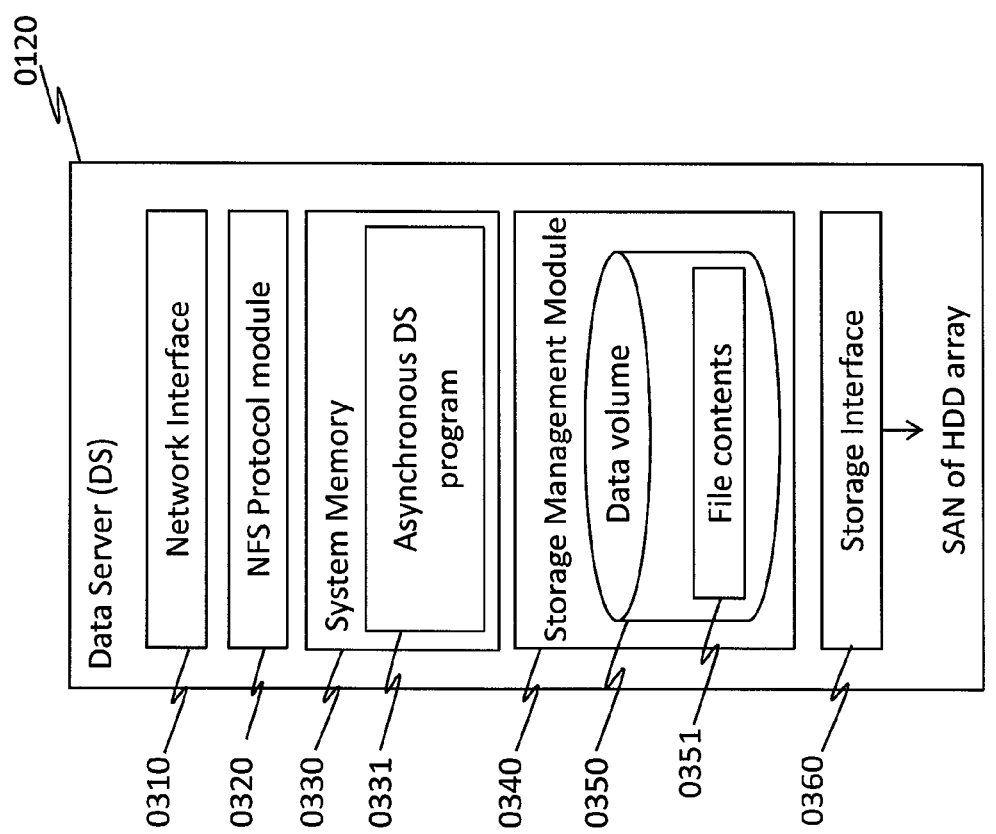
FIG. 3 is a block diagram illustrating components of a DS.

FIG. 3 is a block diagram illustrating components of a DS. The DS 0120 may include, but is not limited to, a network interface 0310, an NFS protocol module 0320, a system memory 0330, a storage management module 0340, a data volume 0350, and a storage interface 0360. The network interface 0310 connects the DS 0120 to the network 0100 for communication with MDSs 0110 and clients 0130. The NFS protocol module 0320 is responsible for server functionality of NFS protocol and serves operations from MDSs 0110 and clients 0130. The system memory 0330 contains the asynchronous DS program 0331 which provides supporting functionality to NFS protocol module 0320 to process operations initiated by MDSs 0110 in an asynchronous manner. The storage interface 0360 connects the storage management module 0340 to a storage device over the storage area network (SAN) or to an internal hard disk drive (HDD) for raw data storage. The storage management module 0340 organizes raw data onto a data volume 0350 which stores file contents (data) 0351.

Figure 4:
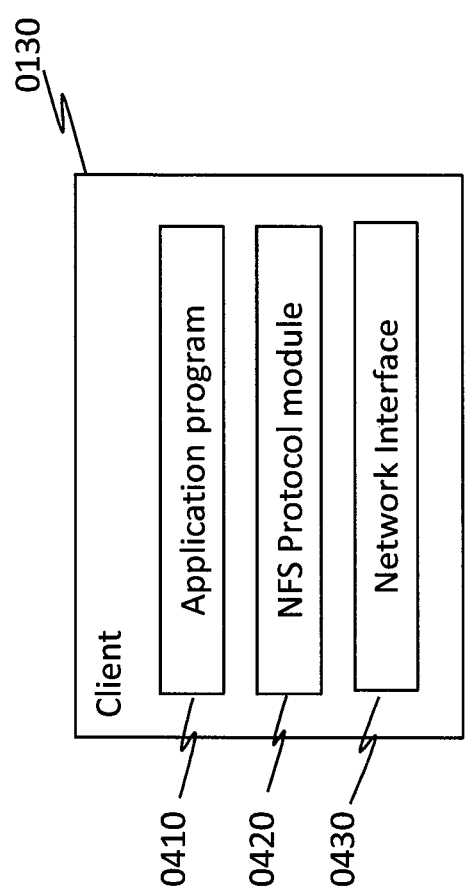
FIG. 4 is a block diagram illustrating components of a client.

FIG. 4 is a block diagram illustrating components of a client. The client 0130 may include, but is not limited to, an application program 0410, an NFS protocol module 0420, and a network interface 0430. The application program 0410 generates metadata operations and read/write operations. The NFS protocol module 0420 is responsible for implementing client functionality of NFS protocol, using which metadata operations are sent to MDSs 0110 and read/write operations are sent to DSs 0120. The network interface 0430 connects the client 0130 to the network 0100 for communication with MDSs 0110 and DSs 0120.

Figure 5:
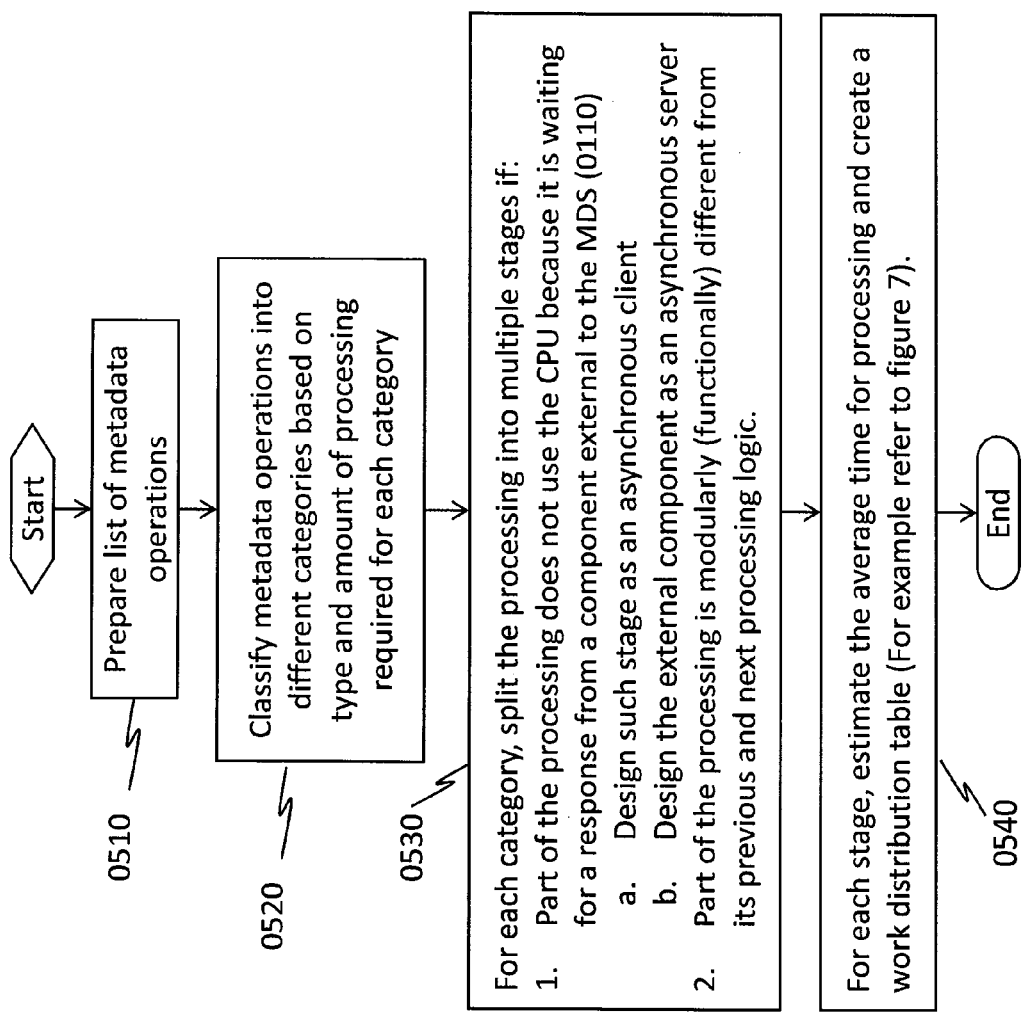
FIG. 5 is a flow diagram illustrating an exemplary set of steps to classify metadata operations into different categories and to split the processing of each category into a plurality of stages.

FIG. 5 is a flow diagram illustrating an exemplary set of steps to classify metadata operations into different categories and to split the processing of each category into a plurality of stages (this is done during the design of the MDS). A stage can be defined as a computer process/software module or component. This work flow is used at the time of designing the MDS 0110. During such work flow, the target deployment configuration and target protocol determine the metadata operation categories, the number of processing stages for each category, and the estimated amount of processing time for each stage. The following steps are performed to complete this workflow. In step 0510, an exhaustive list of metadata operations is prepared. In step 0520, the metadata operations listed in step 0510 are classified into different categories based on the type and amount of processing required for each category.

FIG. 6 illustrates an exemplary metadata operation classification table 028K which contains a classified list of metadata operations for NFSV4.1 protocol. The table may include, but is not limited to, category name 0640 and metadata operations 0650. For the illustration presented in this description, metadata operations are classified into three categories. The first category, normal 0610, represents metadata operations which only need processing by the MDS 0110 which received that operation and the receiving MDS (or first MDS) does not need any form of communication to external component or machine. The second category, special type A 0620, represents metadata operations that are required as part of pNFS specification. Such operations typically need communication between MDS 0110 and plurality of DSs 0120 and need significantly longer processing time compared to normal 0610 category metadata operations. The third category, special type B 0630, represents metadata operations that need communication between the first MDS 0110 and one or more second MDSs 0110 in the system. Such systems represent an MDS cluster containing a plurality of MDSs 0110, virtualized to provide a global namespace to clients 0130. Metadata operations under the special type B 0630 category need considerably longer processing time compared to metadata operations belonging to the normal 0610 category.

Referring back to FIG. 5, after classifying the list of metadata operations into categories in step 0520, the following is performed in step 0530. For each metadata operation category identified in step 0520, the metadata operation processing is split into a plurality of stages. The task of splitting the processing into multiple stages is performed at the time of designing the MDS 0110 itself. Step 0530 provides an exemplary set of policies using which this task is performed. As per the first policy, operation processing is split into a stage if that part of the processing involves communication with a component external to the MDS 0110. In addition, it is critical to design the logic of such a stage as an asynchronous client component and design the corresponding external component with which this stage communicates as an asynchronous server component (such as asynchronous DS program 0331 and inter-MDS asynchronous server program 028G). The second policy in step 0530 recommends splitting the part of processing into a stage if that part of processing is modularly (functionally) different from its preceding and succeeding processing logic. The policies listed in step 0530 can be extended or modified based on the specific MDS 0110 design requirements. As an example, a policy can be defined to split the processing into a stage if that part of processing needs a write to a heavily accessed hard disk drive. In step 0540, the average processing time required for each stage is estimated either based on empirical analysis using previously profiled data on an MDS 0110 with similar machine configuration or by theoretical hypothesis. The list of metadata operation categories, the list of stages for each category, and the estimated processing time are recorded in a table. This table is referred to as the work distribution table 0286.

FIG. 7 depicts an exemplary workload distribution table 0286 which is used to assist in describing the present invention. The normal 0610 category processing consists of one stage, namely, primary metadata processor 0710 which is the primary stage responsible for namespace and metadata management on MDS 0110. The estimated processing time for primary metadata processor 0710 is t1 0711.

The special type A 0620 category consists of six stages. The second stage is pNFS manager 0720 which is responsible for performing pNFS related metadata management including preparing requests to be sent to DSs 0120. The estimated processing time for pNFS manager 0720 is A_t2 0721. The third stage is MDS-DS asynchronous client 0730 which is responsible for sending asynchronous requests to DSs 0120. After the asynchronous request is acknowledged by DS 0120, the resources allocated to that metadata operation are free to be used for the subsequent metadata operations. The estimated processing time for MDS-DS asynchronous client 0730 is A_t3 0731. The fourth stage is asynchronous DS processing 0740 performed on DSs 0120. In this stage, DSs 0120 processes asynchronous requests from MDS 0110 and sends a response back to MDS 0110 after processing completes. The estimated processing time for asynchronous DS processing 0740 is DS_t4 0741. However, it is to be noted that during this time, no resource is allocated for the corresponding metadata operation on MDS 0110. The fifth stage is DS response aggregator 0750 which is responsible for receiving responses from plurality of DSs 0120 and aggregating all the responses to a single context representing the corresponding metadata operation. The estimated processing time for DS response aggregator 0750 is A_t5 0751. The last stage is secondary metadata processor 0760 which is responsible for post processing on MDS 0110 for special category type A 0620 operations. The estimated processing time for secondary metadata processor 07A0 is t6 07A1.

The special type B 0630 category consists of six stages. The first stage is primary metadata processor 0710. The second stage is MDSC manager 0760 which is responsible for performing MDS cluster management including preparing requests to be sent to other MDSs 0110. The estimated processing time for MDSC manager 0760 is B_t2 0761. The third stage is inter-MDS asynchronous client 0770 which is responsible for sending asynchronous requests to one or more second MDSs 0110. After the asynchronous request is acknowledged by a second MDS 0110, the resources allocated to that metadata operation are free to be used for the subsequent metadata operations. The estimated processing time for inter-MDS asynchronous client 0770 is B_t3 0771. The fourth stage is asynchronous inter-MDS processing 0780 which is performed on one or more second MDSs 0110. In this stage, the second MDS 0110 processes asynchronous requests from first MDS 0110 and sends a response back to first MDS 0110 after processing completes. The estimated processing time for asynchronous inter-MDS processing 0780 is MDS_t4 0781. Again, it is to be noted that during this time, no resource is allocated for the corresponding metadata operation on first MDS 0110. The fifth stage is MDS response aggregator 0790 which is responsible for receiving responses from a plurality of MDSs 0110 and aggregating all the responses to a single context representing the corresponding metadata operation. The estimated processing time for MDS response aggregator 0790 is B_t5 0791. The last stage is secondary metadata processor 07A0 which is responsible for post processing on MDS 0110 for special category type B 0630 operations. The estimated processing time for secondary metadata processor 07A0 is t6 07A1.

FIG. 8 is a table illustrating an exemplary list of metadata operations and for each metadata operation a corresponding list of compound operations which are part of NFSV4.1 specification. Get attributes 0810 metadata operation is classified as normal 0610 category. File creation 0820 and get file layout 0840 metadata operations are classified as special type A 0620 category. Directory creation 0830 and get file attributes 0850 (for files managed by other MDSs 0110) metadata operations are classified as special type B 0630 category.

Figure 9:
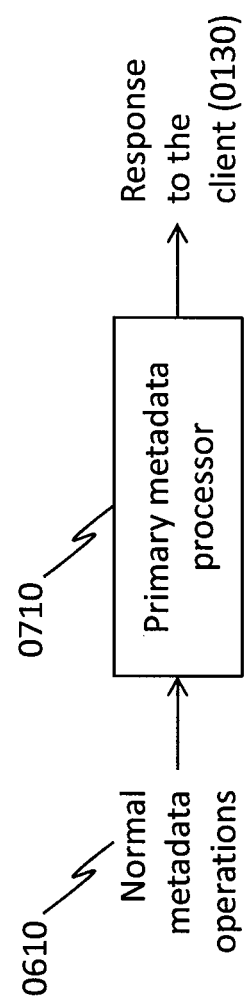
FIG. 9 is a flow diagram illustrating the exemplary processing stages for normal operations according to the first embodiment.

FIG. 9 is a flow diagram illustrating the exemplary processing stages for normal 0610 operations according to the first embodiment. For example, get attributes 0810 metadata operation initiated by a client 0130 is received by an MDS 0110. All three compound operations, namely, SEQUENCE, PUTFH, and GETATTR are processed in the primary metadata processor 0710 stage.

Figure 10:
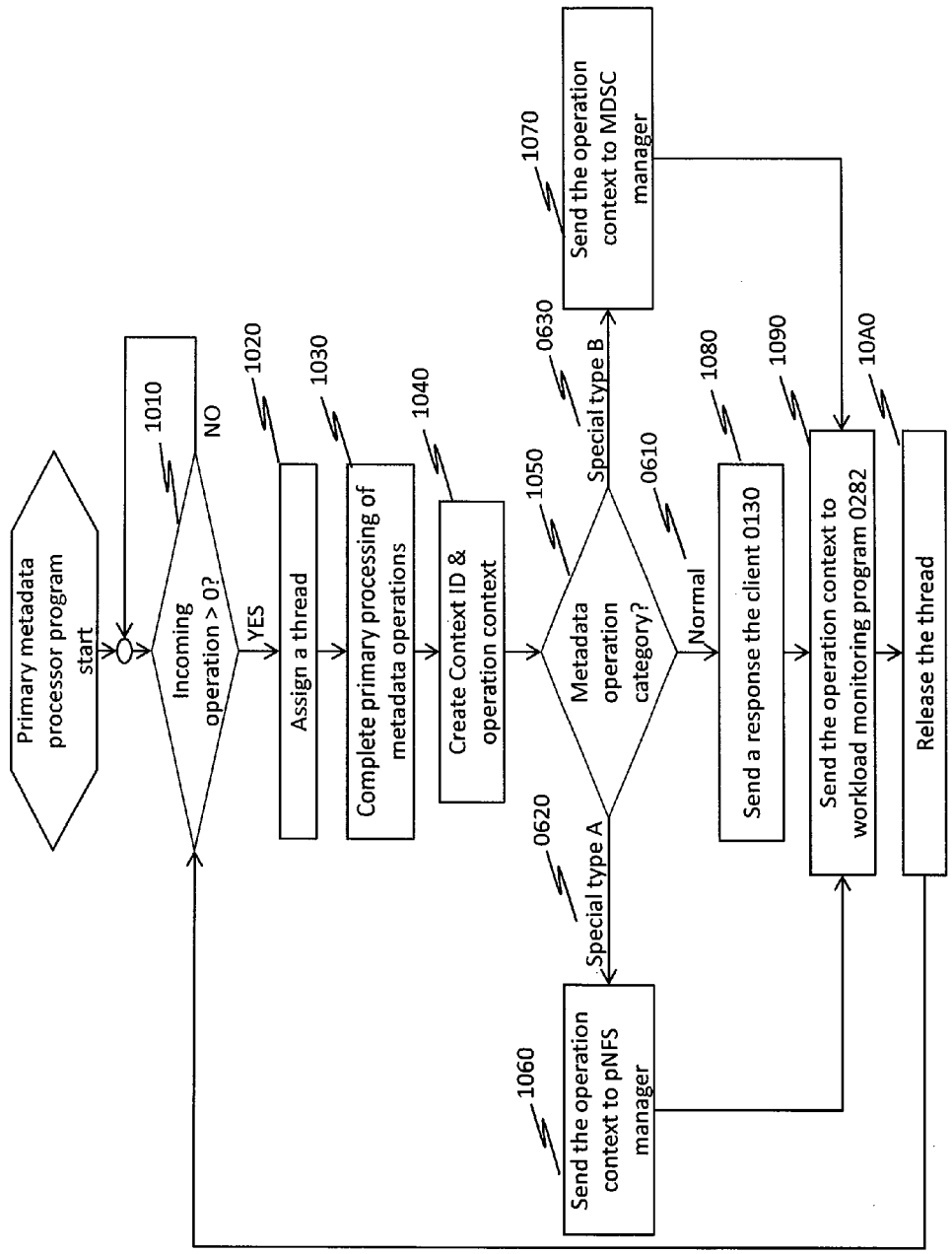
FIG. 10 is a flow diagram of the exemplary steps performed by the primary metadata processor program to complete the primary metadata processor stage according to the first embodiment.
Figure 20:
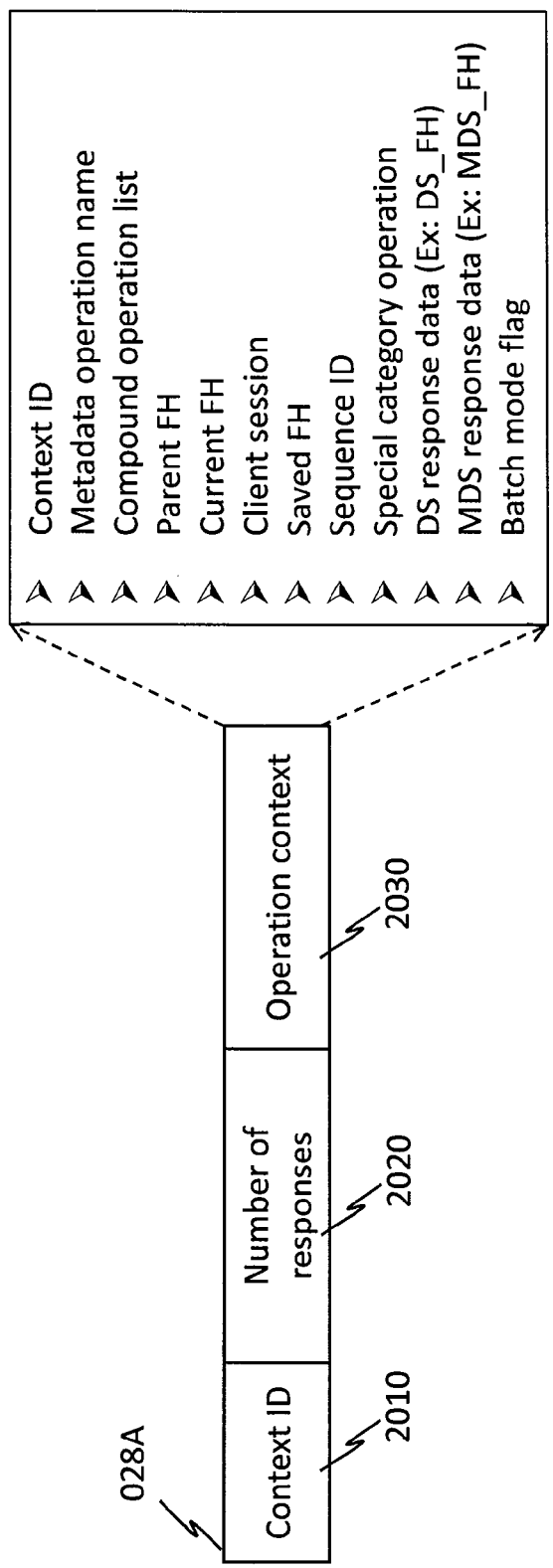
FIG. 20 illustrates an exemplary pending operation context table.
Figure 21:
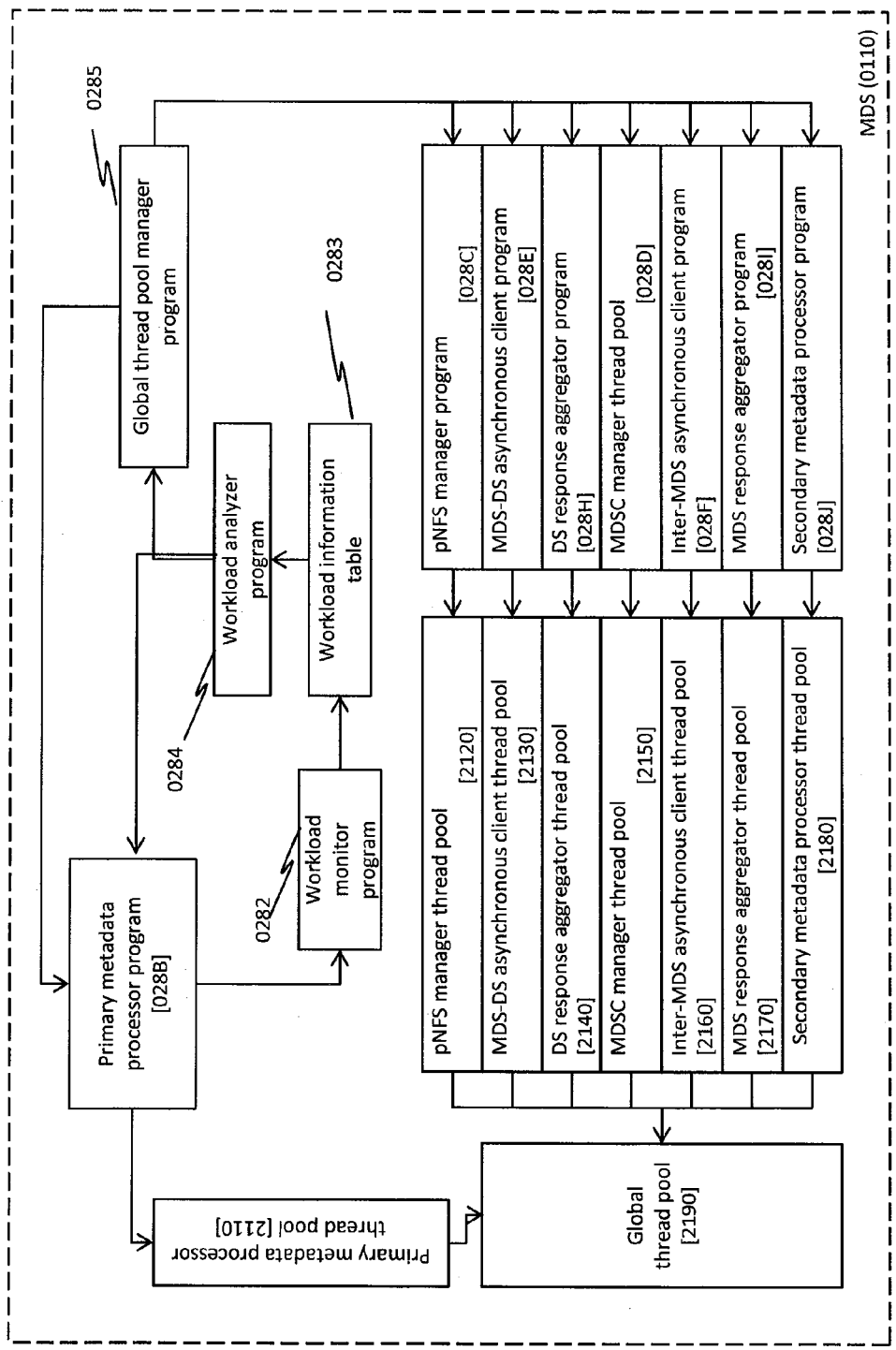
FIG. 21 is an overview illustrating the components of MDS that complete the rest of the functionality of the first embodiment.

FIG. 10 is a flow diagram of the exemplary steps performed by the primary metadata processor program 028B to complete the primary metadata processor 0710 stage according to the first embodiment. In step 1010, the program iteratively checks if there is any incoming operation and loops back if NO. If YES, in step 1020, a thread is assigned. A thread can be defined as the unit of processing. A thread executes a set of programmed instructions using allocated system resources such as CPU time, memory, etc. A thread for allocation is obtained from a primary metadata processor thread pool 2110 (FIG. 21). If there is no thread available in the primary metadata processor thread pool 2110, the primary metadata processor 0710 stage stalls, meaning no further incoming operation is processed until a thread is available. Step 1030 completes primary processing of metadata operations, for example, SEQUENCE, PUTFH, and GETATTR processing for get attributes 0810 metadata operation. Step 1040 creates a context ID 2010 and operation context 2030 (FIG. 20). Step 1050 checks the category of metadata operation by looking up the metadata operation classification table 028K. If it is normal 0610, a response is sent to the client 0130 in step 1080. If it is special type A, 0620, the program sends the operation context to the pNFS manager program 028C in step 1060. If it is special type B 0630, the program sends the operation context to the MDSC manager program 028D in step 1070.

In step 1090, the operation context 2030 is sent to the workload monitoring program 0282. In step 10A0, the thread is released. Other steps of the program are explained while describing processing of special type A & B category operations.

Figure 11:
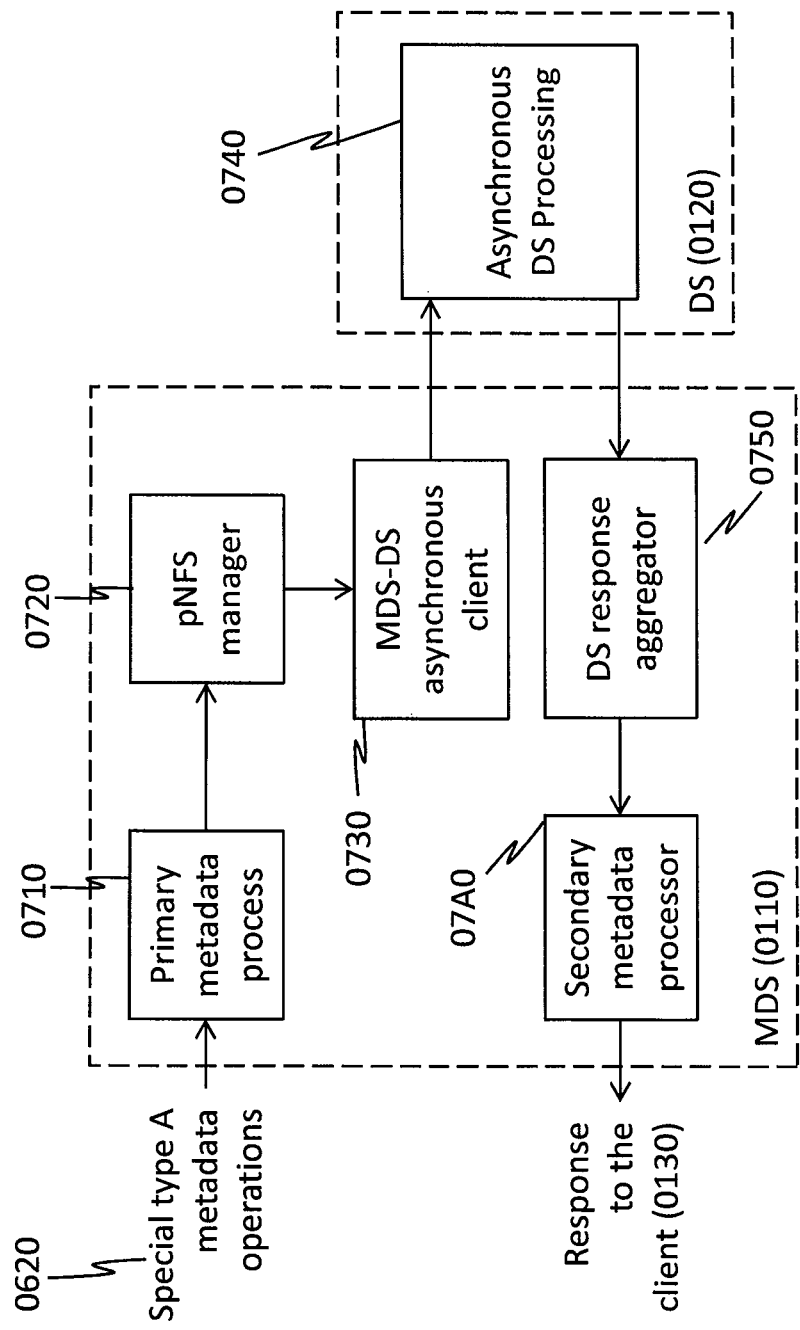
FIG. 11 is a flow diagram illustrating the exemplary processing stages for special type A operations for the first embodiment.

FIG. 11 is a flow diagram illustrating the exemplary processing stages for special type A 0620 operations for the first embodiment. For example, file creation 0820 metadata operation initiated by a client 0130 is received by an MDS 0110. The primary metadata processor 0710 stage processes SEQUENCE, PUTFH, and SAVEFH. In step 1060 (FIG. 10), for this category, the operation context 2030 is sent to the pNFS manager program 028C. FIG. 11 shows the process flow from the pNFS manager stage 0720 (FIG. 12) to the MDS-DS asynchronous client stage 0730 (FIG. 13), and then to the asynchronous DS processing stage 0740.

Figure 12:
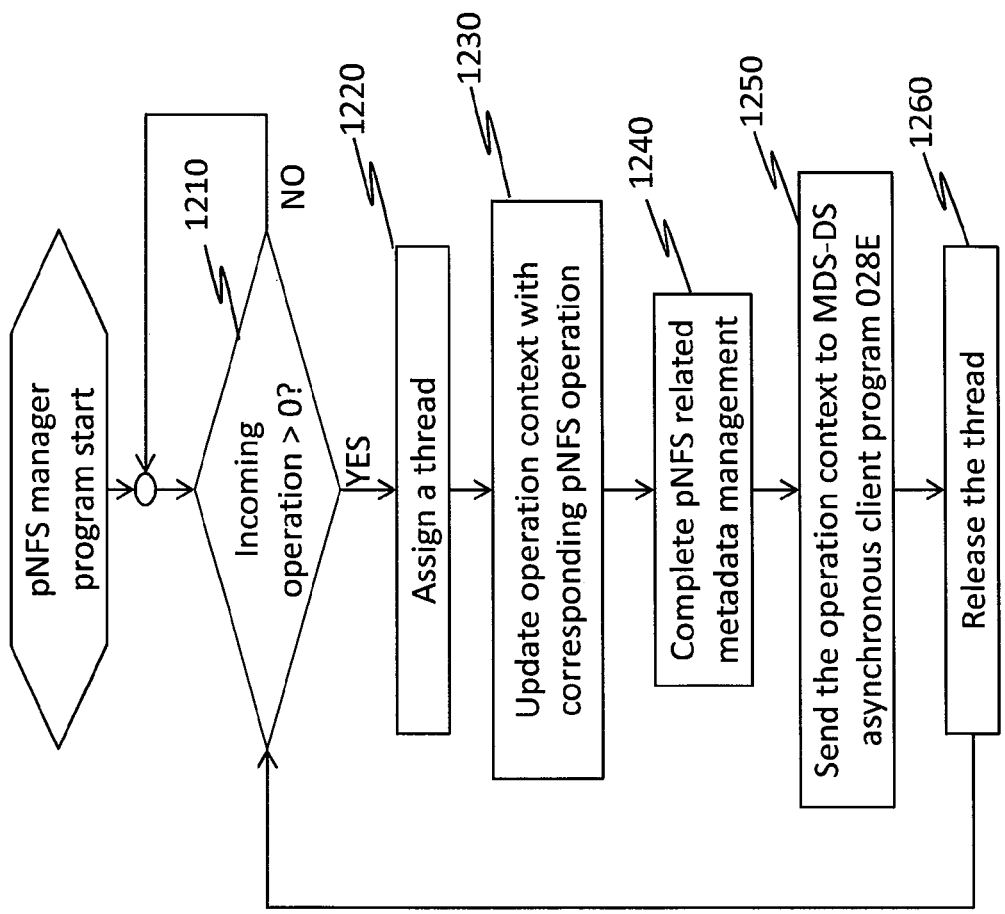
FIG. 12 is a flow diagram of the exemplary steps performed by the pNFS manager program to complete the pNFS manager stage.

FIG. 12 is a flow diagram of the exemplary steps performed by the pNFS manager program 028C to complete the pNFS manager 0720 stage. In step 1210, the program iteratively checks if there is any incoming operation and loops back if NO. If YES, in step 1220, a thread is assigned from a pNFS manager thread pool 2120 (FIG. 21). If there is no thread available, the pNFS manager 0720 stage stalls until a thread is available. Step 1230 processes the OPEN operation and updates the operation context 2030 with corresponding pNFS operation. In step 1240, pNFS related metadata management is completed. In step 1250, the operation context 2030 is sent to the MDS-DS asynchronous client program 028E. In step 1260, the thread is released.

Figure 13:
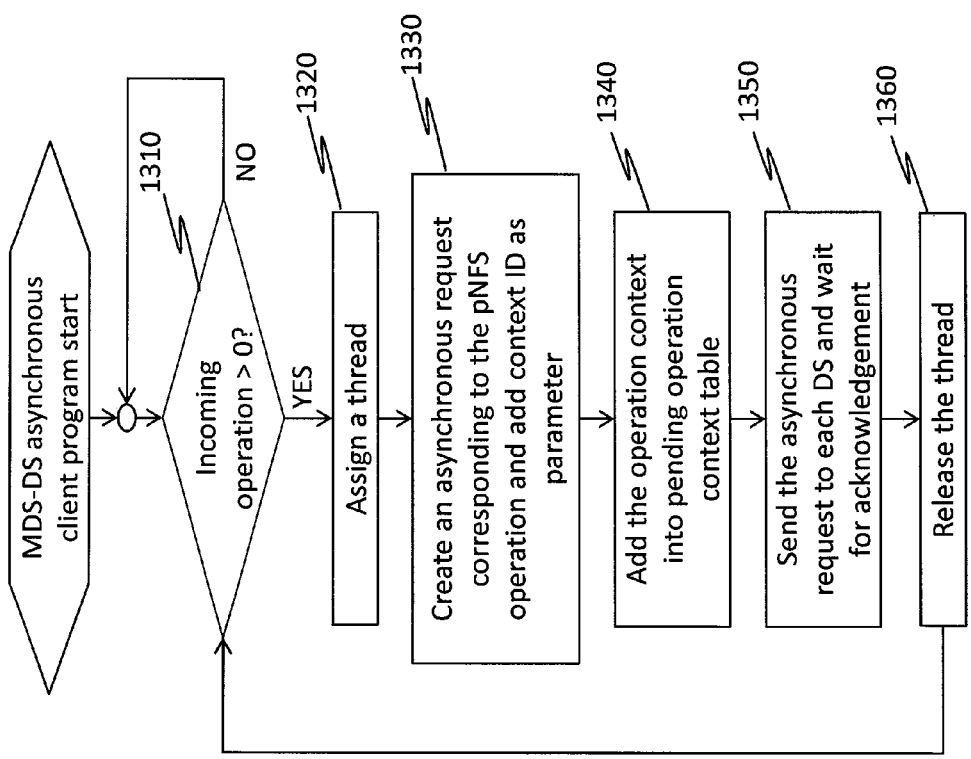
FIG. 13 is a flow diagram of the exemplary steps performed by the MDS-DS asynchronous client program to complete the MDS-DS asynchronous client stage according to the first embodiment.

FIG. 13 is a flow diagram of the exemplary steps performed by the MDS-DS asynchronous client program 028E to complete the MDS-DS asynchronous client 0730 stage according to the first embodiment. In step 1310, the program iteratively checks if there is any incoming operation and loops back if NO. If YES, in step 1320, a thread is assigned from an MDS-DS asynchronous client thread pool 2130 (FIG. 21). If there is no thread available, the MDS-DS asynchronous client 0730 stage stalls until a thread is available. Step 1330 creates an asynchronous request corresponding to the pNFS operation and adds the context ID 2010 as a parameter. In step 1340, a pointer to operation context 2030 is added into the pending operation context table 028A. In step 1350, the program sends the asynchronous request to each DS 0120 and waits for the acknowledgement. After receiving the acknowledgement, in step 1360, the thread is released.

Referring back to FIG. 11, the asynchronous DS program 0331 on the DS 0120 provides the asynchronous functionality for requests received from the MDS 0110. After the request is processed on the DS 0120, a response, which also includes the context ID 2010, is sent to the MDS 0110. The response from each DS 0120 is received by the DS response aggregator program 028H on the MDS 0110. FIG. 11 shows the process flow from the asynchronous DS processing stage 0740 to the DS response aggregator stage 0750 (FIG. 14), and then to the secondary metadata processor stage 07A0 (FIG. 15) to produce a response to the client 0130.

Figure 14:
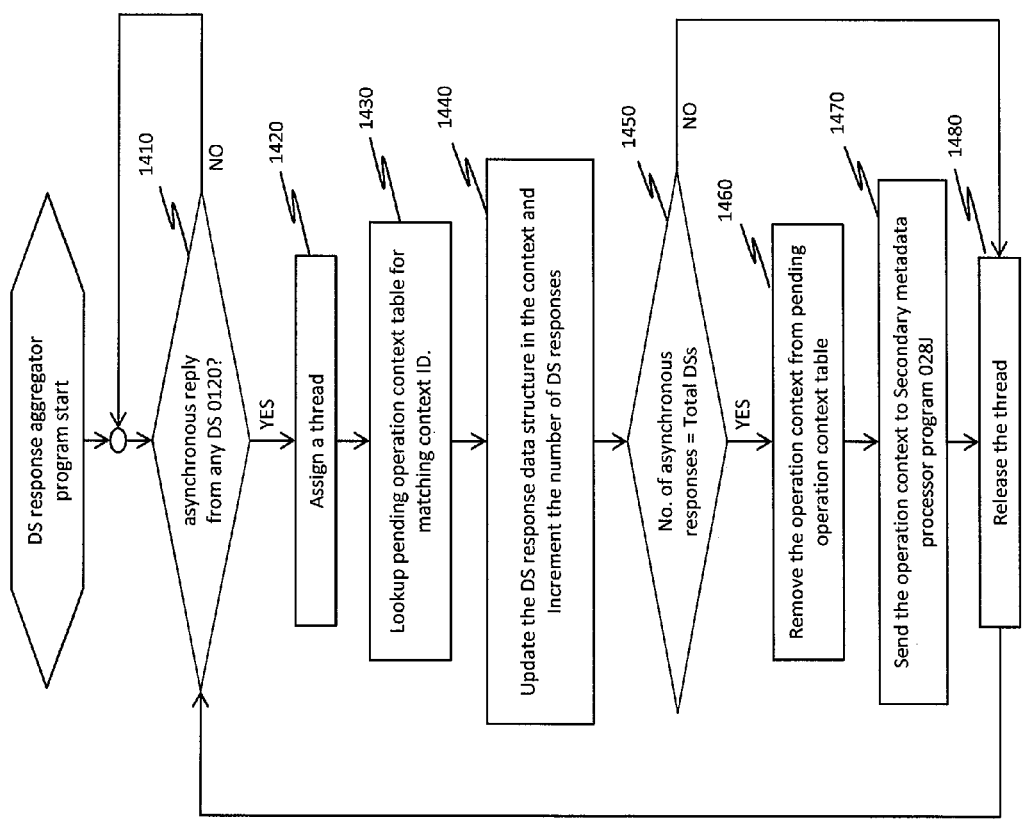
FIG. 14 is a flow diagram of the exemplary steps performed by the DS response aggregator program to complete the DS response aggregator stage according to the first embodiment.

FIG. 14 is a flow diagram of the exemplary steps performed by the DS response aggregator program 028H to complete the DS response aggregator 0750 stage according to the first embodiment. In step 1410, the program iteratively checks if there is any asynchronous reply from any DS 0120 and loops back if NO. If YES, in step 1420, a thread is assigned from a DS response aggregator thread pool 2140 (FIG. 21). If there is no thread available, the DS response aggregator 0750 stage stalls until a thread is available. Step 1430 looks up the pending operation context table 028A for a matching context ID 2010. In step 1440, the operation context 2030 is updated with the response data from DS 0120 and also increments the number of responses 2020 column for the corresponding operation context ID 2010 in the pending operation context table 028A. In step 1450, it checks if the number of responses 2020 for the corresponding context ID 2010 is equal to the total number of DSs 0120 in the configuration. If NO, the thread is released in step 1480. If YES, the operation context 2030 is removed from the pending operation context table 028A in step 1460. In step 1470, the operation context 2030 is forwarded to the secondary metadata processor program 028J. Then, in step 1480, the thread is released.

Figure 15:
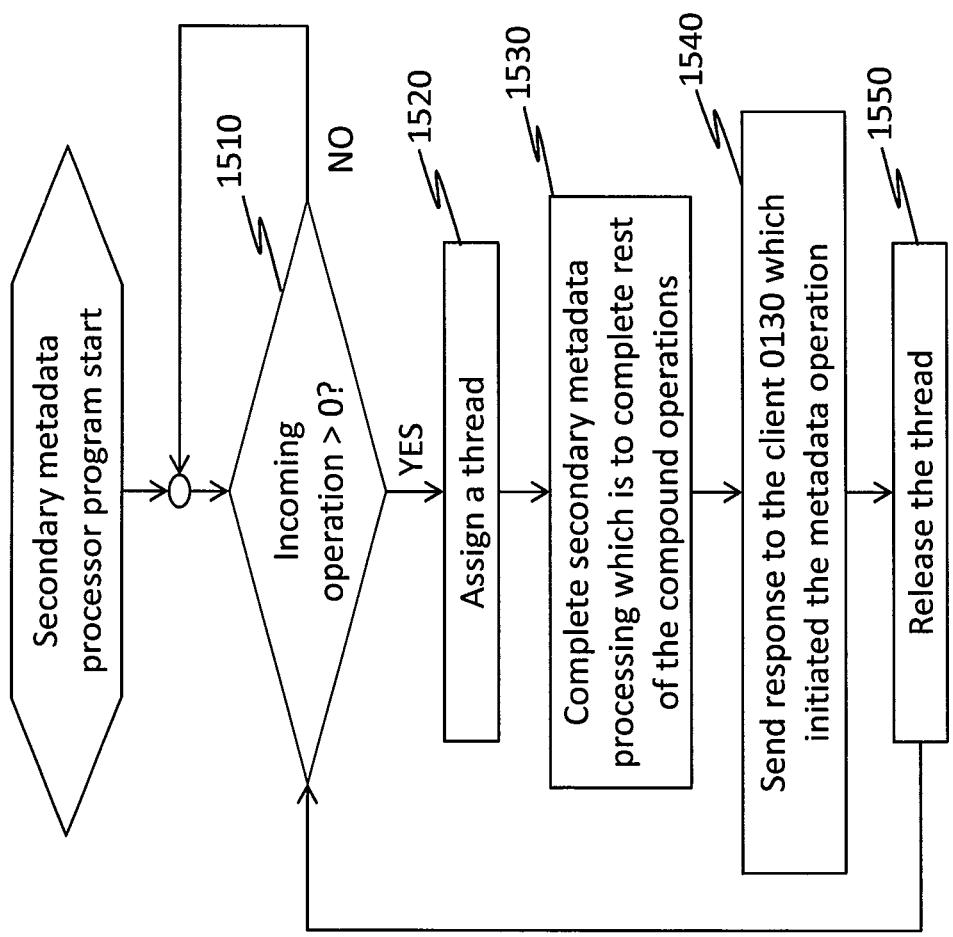
FIG. 15 is a flow diagram of the exemplary steps performed by the secondary metadata processor program to complete the secondary metadata processor stage.

FIG. 15 is a flow diagram of the exemplary steps performed by the secondary metadata processor program 028J to complete the secondary metadata processor 07A0 stage. In step 1510, the program iteratively checks if there is any incoming operation and loops back if NO. If YES, in step 1520, a thread is assigned from a secondary metadata processor thread pool 2180 (FIG. 21). If there is no thread available, the secondary metadata processor 07A0 stage stalls until a thread is available. Step 1530 performs the rest of the compound operation processing. For the file creation 0820 metadata operation, GETFH, GETATTR, RESTOREFH, and GETATTR are processed. In step 1540, a response is sent to the client 0130 which initiated this metadata operation. In step 1550, the thread is released.

Figure 16:
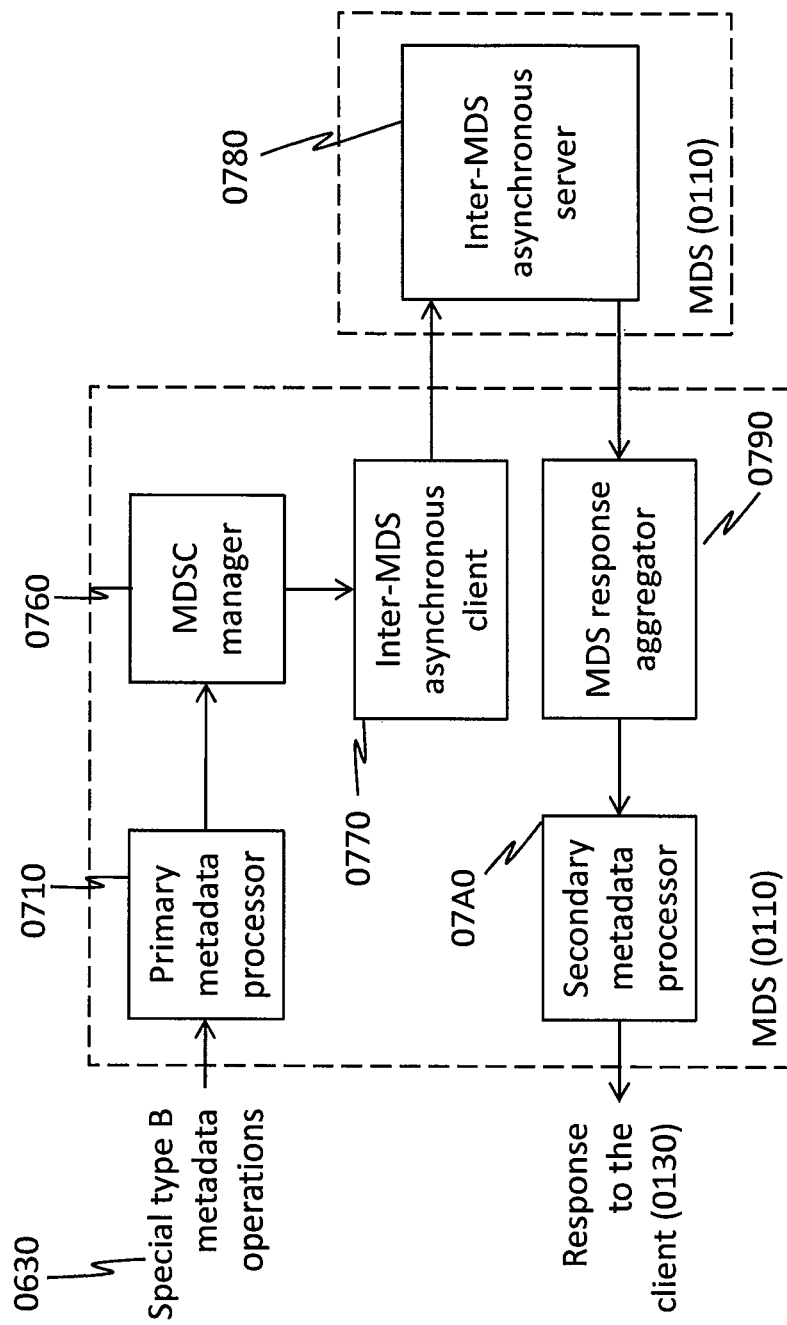
FIG. 16 is a flow diagram illustrating the exemplary processing stages for special type B category operations for the first embodiment.

FIG. 16 is a flow diagram illustrating the exemplary processing stages for special type B 0630 category operations for the first embodiment. For example, consider a multiple MDS 0110 solution which distributes files and directories across a plurality of MDSs 0110. For illustration purpose, in the multiple MDS 0110 considered, only one second MDS is involved to process metadata operations. In such architecture, consider a directory creation 0820 metadata operation initiated by a client 0130 is received by a first MDS 0110. The primary metadata processor 0710 stage processes SEQUENCE, PUTFH, and SAVEFH. In step 1070 (FIG. 10), for this category, the operation context 2030 is sent to the MDSC manager program 028D. FIG. 16 shows the process flow from the MDSC manager stage 0760 (FIG. 17) to the inter-MDS asynchronous client stage 0770 (FIG. 18), and then to the inter-MDS asynchronous server stage 0780.

Figure 17:
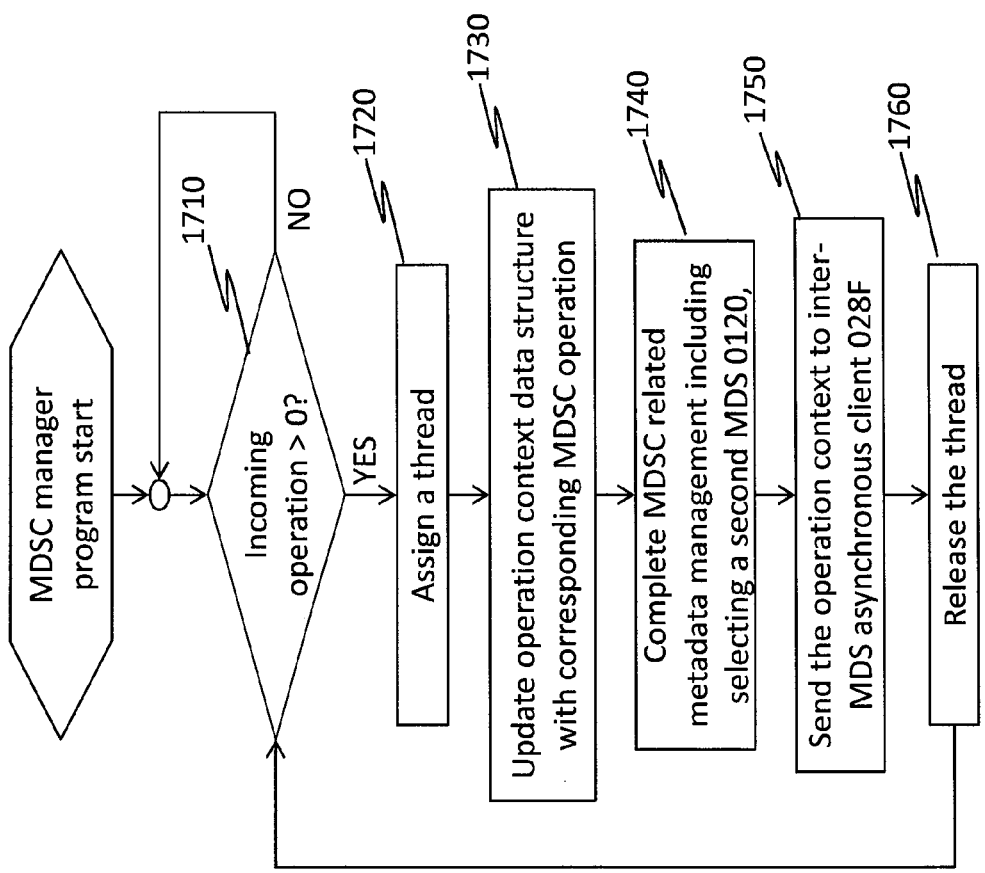
FIG. 17 is a flow diagram of the exemplary steps performed by the MDSC manager program to complete the MDSC manager stage.

FIG. 17 is a flow diagram of the exemplary steps performed by the MDSC manager program 028D to complete the MDSC manager 0760 stage. In step 1710, the program iteratively checks if there is any incoming operation and loops back if NO. If YES, in step 1720, a thread is assigned from an MDSC manager thread pool 2150. If there is no thread available, the MDSC manager 0760 stage stalls until a thread is available. Step 1730 processes the OPEN operation and updates the operation context 2030 with corresponding MDSC operation. In step 1740, MDSC related metadata management is completed including selecting a second MDS to communicate. In step 1750, the operation context 2030 is sent to the inter-MDS asynchronous client program 028F. In step 1760, the thread is released.

Figure 18:
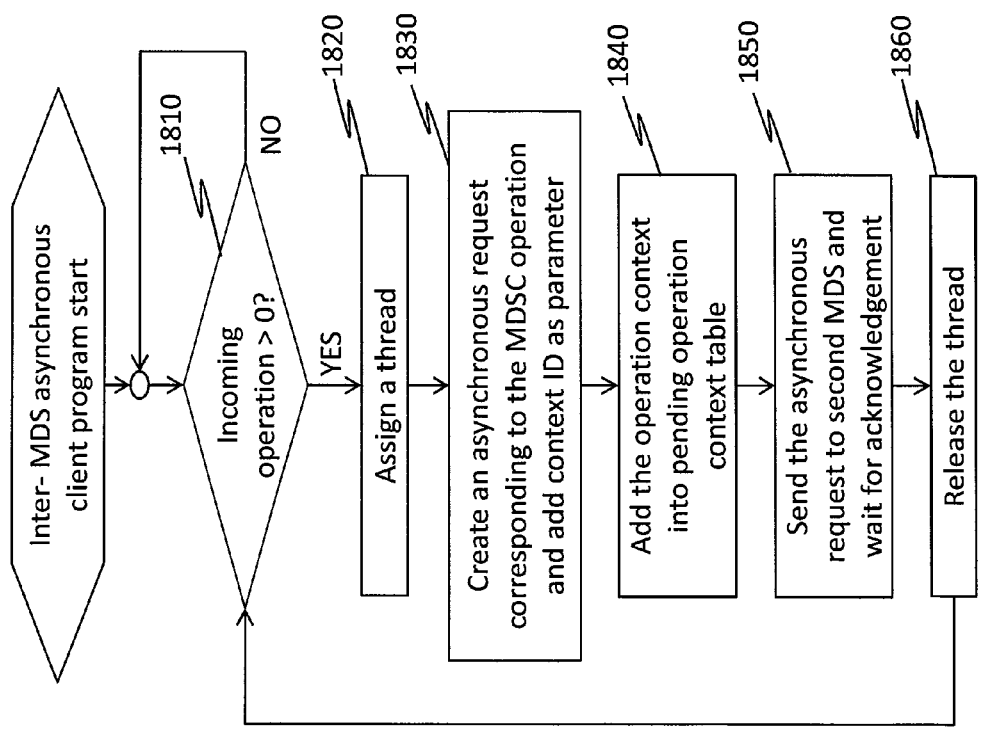
FIG. 18 is a flow diagram of the exemplary steps performed by the inter-MDS asynchronous client program to complete the inter-MDS asynchronous client stage according to the first embodiment.

FIG. 18 is a flow diagram of the exemplary steps performed by the inter-MDS asynchronous client program 028F to complete the inter-MDS asynchronous client 0770 stage according to the first embodiment. In step 1810, the program iteratively checks if there is any incoming operation and loops back if NO. If YES, in step 1820, a thread is assigned from an inter-MDS asynchronous client thread pool 2160 (FIG. 21). If there is no thread available, the inter-MDS asynchronous client 0770 stage stalls until a thread is available. Step 1830 creates an asynchronous request corresponding to MDSC operation and adds the context ID 2010 as a parameter. In step 1840, a pointer to operation context 2030 is added into the pending operation context table 028A. In step 1850, the program sends the asynchronous request to the second MDS 0120 and waits for the acknowledgement. After receiving the acknowledgement, in step 1860, the thread is released.

Referring back to FIG. 16, the inter-MDS asynchronous server program 028G on the second MDS 0110 provides the asynchronous functionality for requests received from the first MDS 0110. After the request is processed on the second MDS 0110, a response, which also includes the context ID 2010, is sent to the first MDS 0110. The response from the second MDS 0120 is received by the MDS response aggregator program 028I on the first MDS 0110. FIG. 16 shows the process flow from the inter-MDS asynchronous server stage 0780 to the MDS response aggregator stage 0790 (FIG. 19), and then to the secondary metadata processor stage 07A0 (FIG. 15) to produce a response to the client 0130.

Figure 19:
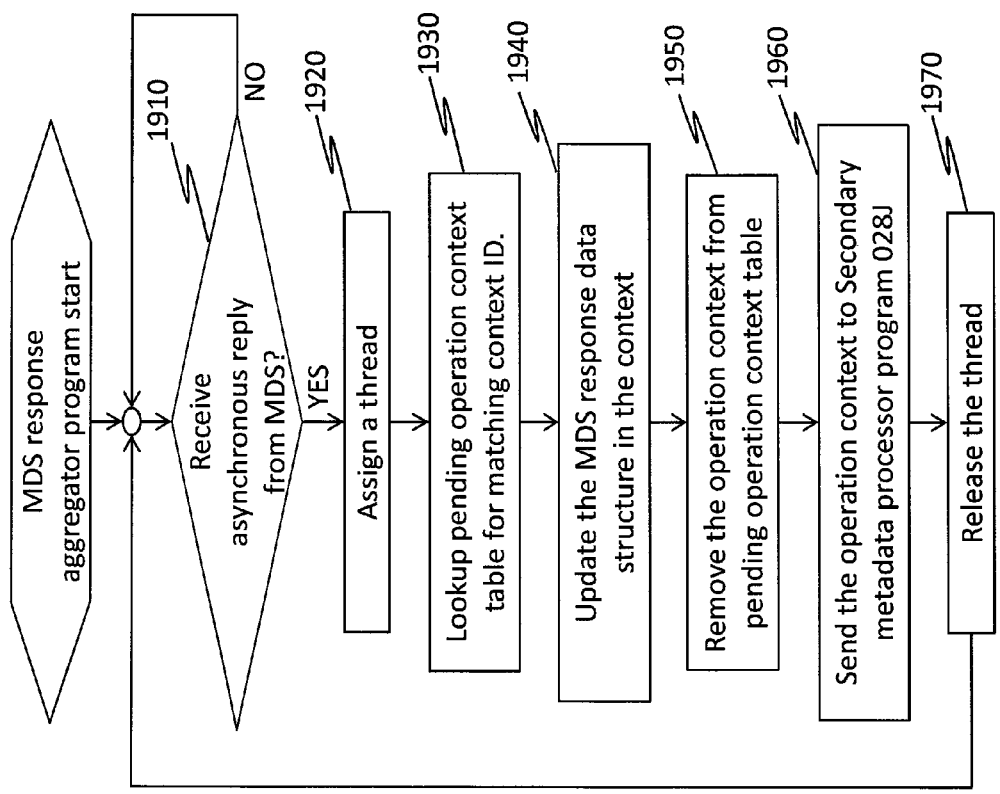
FIG. 19 is a flow diagram of the exemplary steps performed by the MDS response aggregator program to complete the MDS response aggregator stage according to the first embodiment.

FIG. 19 is a flow diagram of the exemplary steps performed by the MDS response aggregator program 028I to complete the MDS response aggregator 0790 stage according to the first embodiment. In step 1910, the program iteratively checks if there is any asynchronous reply from any second MDSs 0110 and loops back if NO. If YES, in step 1920, a thread is assigned from an MDS response aggregator thread pool 2170 (FIG. 21). If there is no thread available, the MDS response aggregator 0790 stage stalls until a thread is available. Step 1930 looks up the pending operation context table 028A for a matching context ID 2010. In step 1940, the operation context 2030 is updated with the response data from the second MDS 0110. In step 1950, the operation context 2030 is removed from the pending operation context table 028A. In step 1960, the operation context 2030 is forwarded to the secondary metadata processor program 028J. In step 1970, the thread is released.

Referring back to FIG. 15 of the exemplary steps performed by the secondary metadata processor program 028J to complete the secondary metadata processor 07A0 stage, in step 1510, the secondary metadata processor program 028J iteratively checks if there is any incoming operation and loops back if NO. If YES, in step 1520, a thread is assigned from a secondary metadata processor thread pool 2180 (FIG. 21). If there is no thread available, the secondary metadata processor 07A0 stage stalls until a thread is available. Step 1530 performs the rest of the compound operation processing. For the directory creation 0830 metadata operation, GETFH, GETATTR, RESTOREFH, and GETATTR are processed. In step 1540, a response is sent to the client 0130 which initiated this metadata operation. In step 1550, the thread is released.

FIG. 20 illustrates an exemplary pending operation context table 028A which is referenced and updated by the primary metadata processor program 028B, MDS-DS asynchronous client program 028E, inter-MDS asynchronous client program 028F, DS response aggregator program 028H, and MDS response aggregator program 028I. The context ID 2010 column contains the metadata operations context identifier. The number of responses 2020 column contains the number of asynchronous responses received by the MDS 0110 for a specific context ID 2010. The operation context 2030 column contains a pointer to the metadata operation context.

FIG. 21 is an overview illustrating the components of MDS 0110 that complete the rest of the functionality of the first embodiment. Referring back to FIG. 10, in step 1090, the operation context 2030 is sent to the workload monitoring program 0282. FIG. 21 shows a plurality of thread pools. There is primary metadata processor thread pool 2110. For special type A category stages, there are pNFS manager thread pool 2120, asynchronous DS client thread pool 2130, and DS response aggregator thread pool 2140. For special type B category stages, there are MDSC manager thread pool 2150, inter-MDS asynchronous client thread pool 2160, and MDS response aggregator thread pool 2170. Starting with the primary metadata processor stage 0710 which receives metadata operations from client 0130, the process flow moves to the workload monitoring program 0282 (FIG. 22), the workload information table 0283 (FIG. 23), the workload analyzer program 0284 (FIG. 24), global thread pool manager program 0285 (FIG. 25), and to the respective thread pools of each stage, that is, primary metadata processor thread pool 2110, pNFS manager thread pool 2120, MDS-DS asynchronous client thread pool 2130, DS response aggregator thread pool 2140, MDSC manager thread pool 2150, inter-MDS asynchronous client thread pool 2160, MDS response aggregator thread pool 2170, and secondary metadata processor thread pool 2180.

Figure 22:
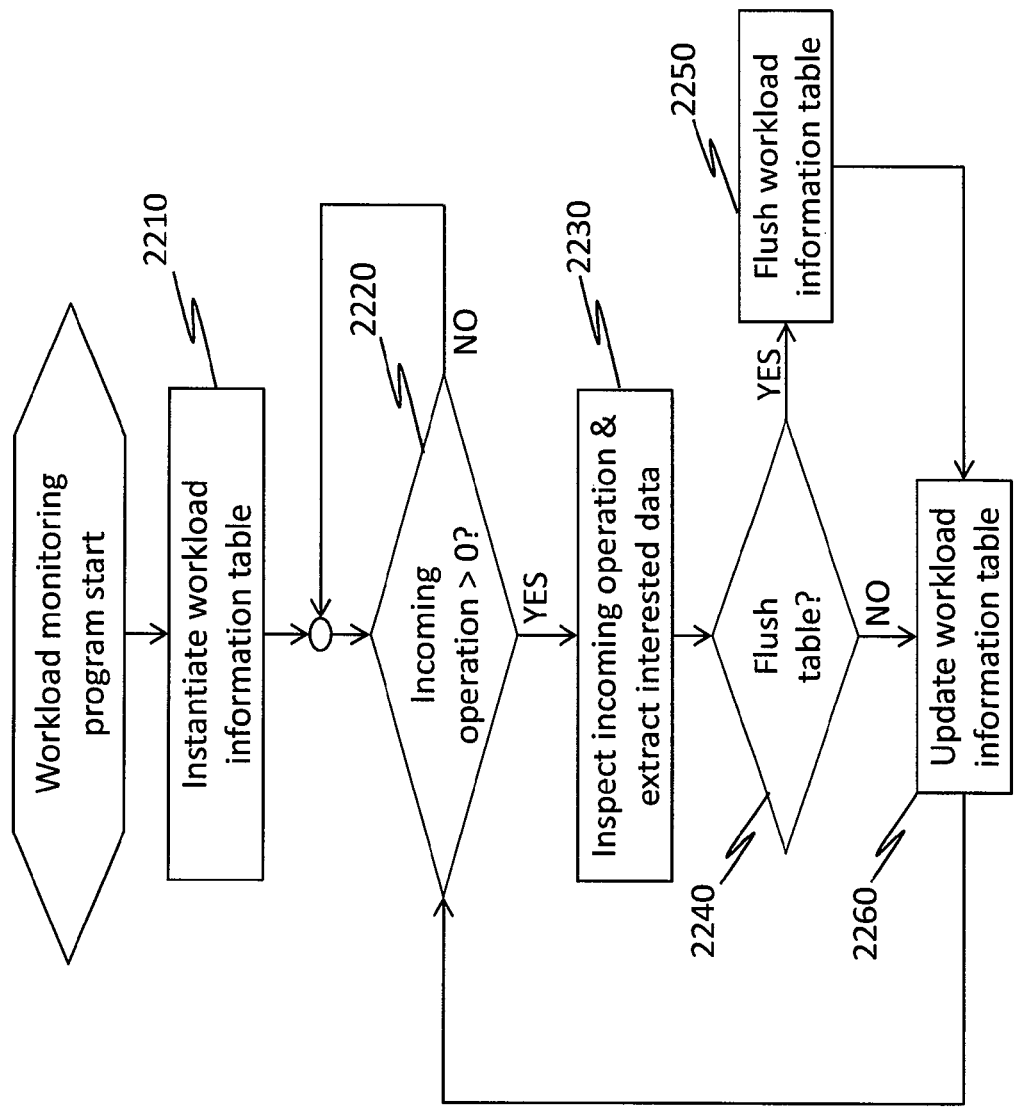
FIG. 22 is a flow diagram illustrating the exemplary steps performed by the workload monitoring program.

FIG. 22 is a flow diagram illustrating the exemplary steps performed by the workload monitoring program 0282. In step 2210, a workload information table 0283 is instantiated. In the next step 2220, the program iteratively checks if there is any incoming operation and loops back if NO. If YES, the metadata operation context 2030 is inspected and required information is extracted from the context in step 2230. This information may include, but is not limited to, metadata operation name. In step 2240, the program checks if there is any outstanding "Flush" signal from the workload analysis program 0284. If NO, the workload information table 0283 is updated in step 2260. If YES, the workload information table is cleared in step 2250. Then, in step 2260, the workload information table is updated with new information. After step 2260, the program loops back to step 2220. This process monitors metadata workload and populates the metadata workload information table 0283.

FIG. 23 illustrates an exemplary workload information table 0283 according to the first embodiment. It may include, but is not limited to, metadata operation category 2310 column, and number of operations 2320 received for each category of metadata operations. The categories include normal 0610, special type A 0620, and special type B 0630 as discussed above. In this example, monitoring the metadata workload involves determining the number of metadata operations for each category of metadata operations.

Figure 24:
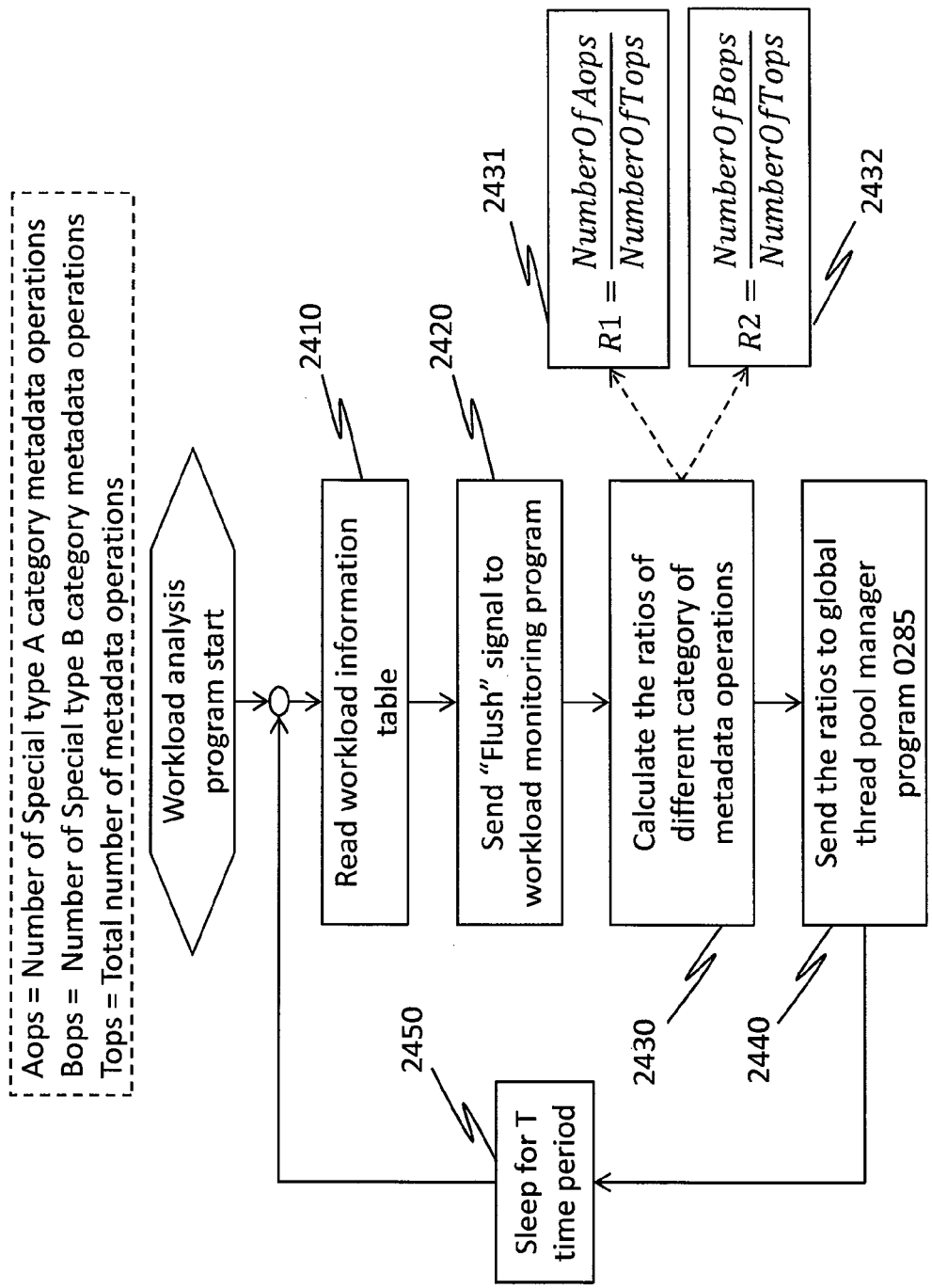
FIG. 24 is a flow diagram illustrating the exemplary steps performed by the workload analysis program according to the first embodiment.

FIG. 24 is a flow diagram illustrating the exemplary steps performed by the workload analysis program 0284 according to the first embodiment. This process analyzes current metadata workload using predefined rules. In step 2410, the workload information table 028A is read. In step 2420, a "Flush" signal is sent to the workload monitoring program 0282 to clear the already read information. In step 2430, ratios of different category of metadata operations are calculated based on the data in the workload information table 0283. The first ratio 2431 R1 is the ratio of "category type A" metadata operations to the total number of metadata operations. The second ratio 2432 R2 is the ratio of "category type B" metadata operations to the total number of metadata operations. In step 2440, these ratios are sent to the global thread pool manager program 0285. In step 2450, the workload analysis program sleeps for a period of 'T' time. After this step, the entire process is repeated after 'T' time period. The value of time 'T' may be empirically set during the design of the MDS 0110. Facility to configure the value of time 'T' may also be provided for tuning purpose after deployment.

Figure 25:
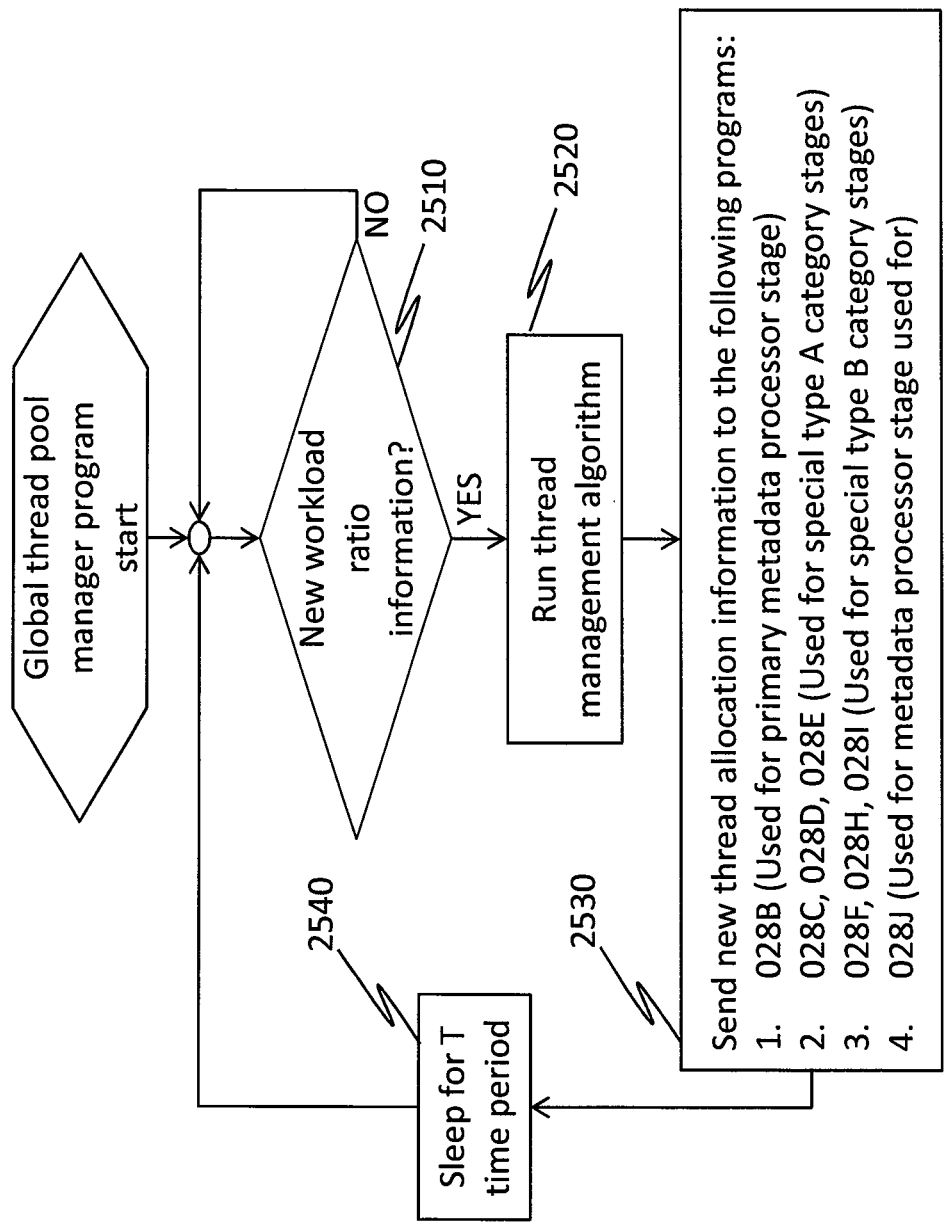
FIG. 25 is a flow diagram illustrating the exemplary steps performed by the global thread pool manager program.

FIG. 25 is a flow diagram illustrating the exemplary steps performed by the global thread pool manager program 0285. In step 2510, the program iteratively checks if there is new workload ratio information (i.e., ratios R1 2431 and R2 2432) from the workload analysis program 0284 and loops back if NO. If YES, the thread management algorithm is executed in step 2520 (see FIG. 26). In step 2530, the new thread allocation information is sent to each of the programs which process one of the stages for metadata operations. The programs are 028B, 028C, 028D, 028E, 028F, 028H, 028I, and 028J. In step 2540, the global thread pool manager program 0285 sleeps for a period of time 'T'. After this step, the entire process is repeated after 'T' time period.

Figure 26:
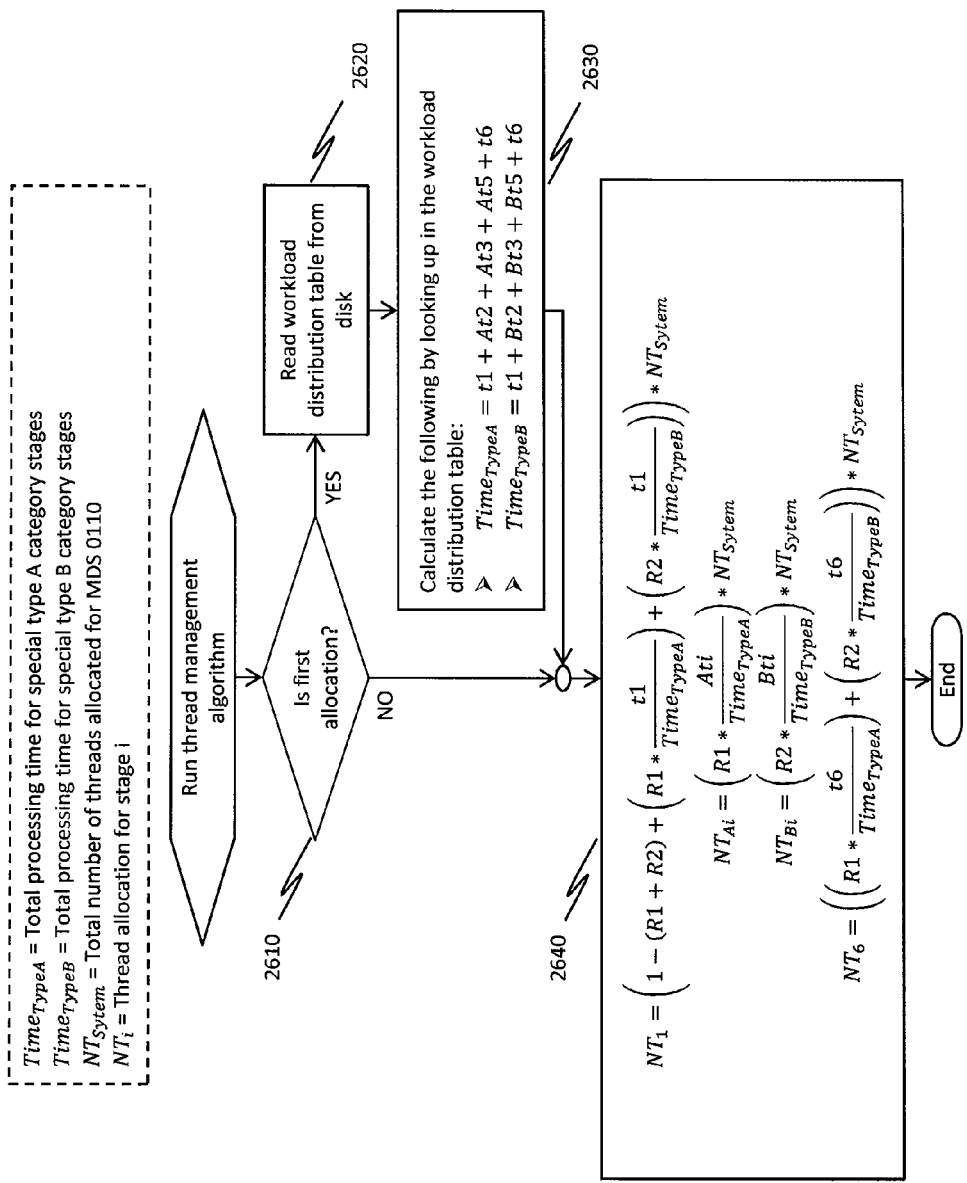
FIG. 26 is a flow diagram illustrating the exemplary steps in the thread management algorithm.

FIG. 26 is a flow diagram illustrating the exemplary steps in the thread management algorithm 2520. In step 2610, if it is the first allocation, the workload distribution table 0286 is read from the disk and loaded into the system memory 0280 as shown in step 2620. Further, in step 2630, the workload distribution table 0286 is read and the following calculations and corresponding results are loaded into the system memory 0280.

1. Total processing time for special type A category stages ($Time_{TypeA}$).
2. Total processing time for special type B category stages ($Time_{TypeB}$).

The next step after step 2610 or step 2630 is 2640. In step 2640, the thread allocation is calculated for each of the programs which process one of the stages for metadata operations. The programs are 028B, 028C, 028D, 028E, 028F, 028H, 028I, and 028J. The rationale behind the below thread allocation scheme is to allocate threads, across all the stages such that, all metadata operations are fairly processed. For example, allocating relatively more threads to the primary metadata processor stage 0710 can improve normal metadata operation but impact the performance of special type A and special type B category metadata operations. The vice versa allocation not only impacts normal operation performance but also leads to underutilization of threads allocated to special category type A and type B stages. This is because, due to shortage of threads in the primary metadata processor stage 0710, there are not enough metadata operations reaching special type A and type B stages. A fair and efficient way to allocate the threads across all the stages is by considering the following information:

1. Ratios of workload R1 2431 and R2 2432.
2. Processing time (estimated as discussed above in step 0540 of FIG. 5) for each stage, that is, $t_i$.
3. The total processing time for each metadata operation category (see FIG. 7), that is,
   a. t1 0711 for Normal category
   b. (t1 0711+At2 0721+At3 0731+At5 0751+t6 07A1) for Special Type A category
   c. (t1 0711+Bt2 0761+Bt3 0771+Bt5 0791+t6 07A1) for Special Type B category
4. Total number of threads allocated to MDS 0110 (e.g., 2730 shown in FIG. 27). This value is statically defined at the time of designing MDS 0110 based on hardware configuration on which the MDS 0110 would be deployed (number of CPUs, system memory, etc.), estimated maximum workload, etc.

FIG. 27 illustrates an exemplary instance of the thread allocation algorithm provided in FIG. 26 using workload percentages 2720 of different metadata operation categories 2710, total number of threads allocated 2730 to the MDS 0110, and processing time 2750 for each processing stage 2740. Column 2760 illustrates an exemplary thread allocation. First, for each metadata operation category 2710, threads are allocated in proportion to the workload percentage. In the example, the normal category is allocated 40 threads, the special type A category is allocated 30 threads, and the special type B category is allocated 30 threads. Then, for each category, threads are distributed across each stage in proportion to the processing time for each stage. In the example, all threads allocated to the normal category are assigned to the primary metadata processor 0710 stage, and the number of threads is 40. Threads allocated to the special type A category are assigned to each stage involved in that category in the ratio of their processing time, which is 1:1:2: 1:1. Numerically, this accounts to 5 threads to the primary metadata processor 0710 stage, 5 threads to the pNFS manager 0720 stage, 10 threads to the MDS-DS asynchronous client 0730 stage, 5 threads to the DS response aggregator 0750 stage, and 5 threads to the secondary metadata processor 07A0 stage. Similarly, the threads allocated to the special type B category stages are distributed in the following manner: 5 threads to the primary metadata processor 0710 stage, 5 threads to the MDSC manager 0760 stage, 10 threads to the inter-MDS asynchronous client 0770 stage, 5 threads to the MDS response aggregator 0790 stage, and 5 threads to the secondary metadata processor 07A0 stage.

Figure 28:
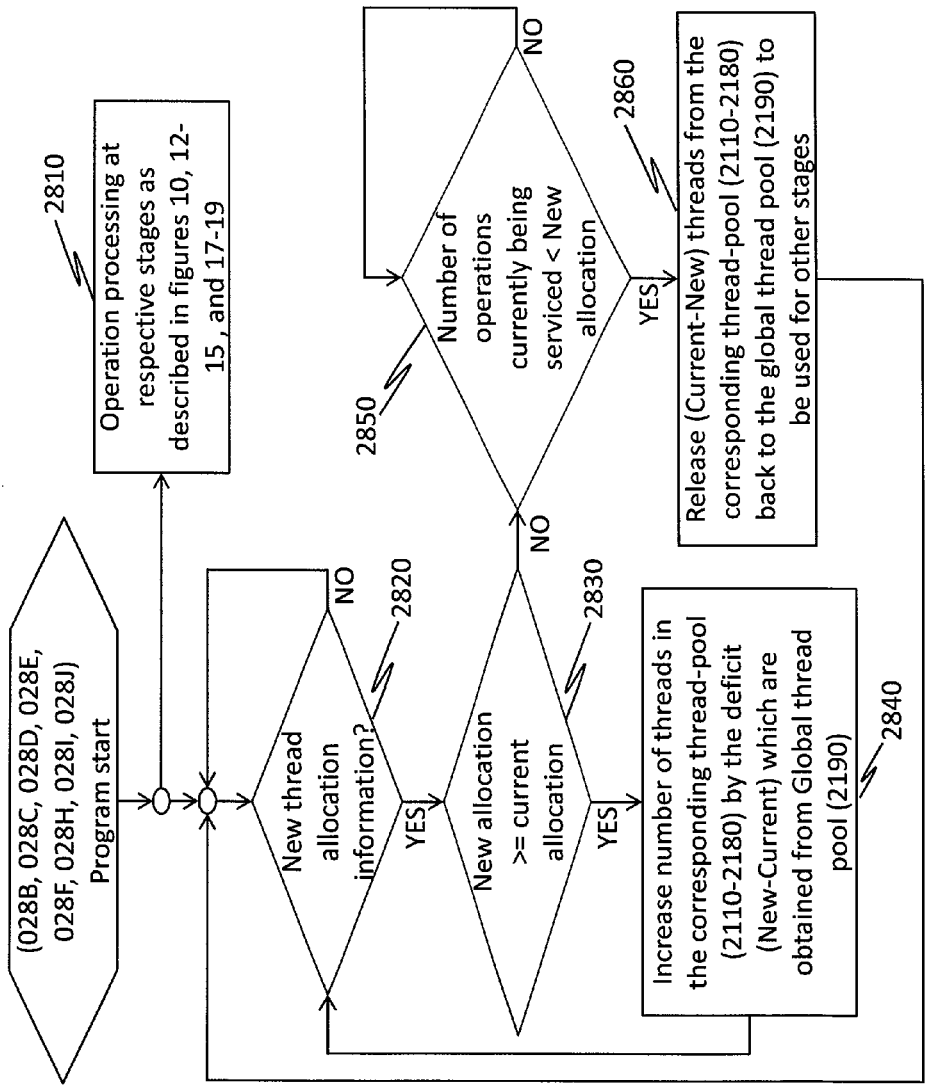
FIG. 28 is a flow diagram illustrating the exemplary steps performed by each stage upon receiving new thread allocation information.

FIG. 28 is a flow diagram illustrating the exemplary steps performed by each stage upon receiving new thread allocation information. In step 2810, each program responsible for a stage performs corresponding processing of incoming metadata operations as described in FIGS. 10, 12-15, and 17-19. The thread allocation for each program is performed in parallel with the metadata operation processing. In step 2820, each program responsible for a stage, iteratively checks if there is new thread allocation information and loops back if NO. If YES, a check is made to find if the new allocation is greater than or equal to the current allocation in step 2830. If YES, the number of threads in the thread-pool (2110-2180 in FIG. 21) corresponding to the stage is increased by the deficit number of threads, that is, new allocation−current allocation, in step 2840. These deficit threads are obtained from the global thread pool 2190. Then, the program continues by returning to step 2820. If NO in step 2830, the number of operations being serviced is checked to determine whether it is less than the new allocation in step 2850. If YES, the additional threads are released from the thread-pool (2110-2180) corresponding to the stage back to the global thread pool 2190 for use by other stages in step 2860. If NO in step 2850, the program waits for the number of operations being serviced to become less than the new allocation by looping back to step 2850. Then, in step 2860, the additional threads are released from the thread-pool (2110-2180) corresponding to the stage back to the global thread pool 2190 for use by other stages. Then, the program continues by returning to step 2820.

Embodiment 2

The description of a second embodiment of the present invention will mainly focus on the differences from the first embodiment.

In the first embodiment, although efficient resource allocation is made for fair servicing of different categories of metadata operations, special type A 0620 and special type B category 0630 may still suffer from network overhead due to MDS-DS or inter-MDS communication. In this embodiment, batch mode of execution is presented for certain metadata operations belonging to special type A and type B categories. This mode of execution can improve the performance of special type A and type B category operations which are executing in batch mode and the performance of normal category metadata operations significantly.

The batch mode execution needs to be designed separately for specific metadata operations. Each of such metadata operation may need specific data structures to be stored in the system memory 0280. In this embodiment, designs for four metadata operations, namely, file creation 0820, directory creation 0830, "get file layout" 0840, and "get file attributes"

0850, are presented but extensions can be made to accommodate batch mode for other metadata operations. The decision to design these four operations to work in batch mode is made after studying the application workload during the design phase of MDS 0110. In the presented embodiment, batch mode execution for four operations is designed after studying the typical behavior of HPC and scientific application workload.

For example, HPC applications tend to create large number of files and directories in parallel at the beginning of the application. Due to the involvement of multiple servers in processing these operations, it may lead to lower MDS performance during that time. Hence, to increase the performance of time consuming metadata operations such as file and directory creation, batch mode execution speculatively creates additional files or directories and fetches corresponding handles in advance. The subsequent file or directory creation operations complete much faster as the corresponding handles are locally available on the MDS 0110 where the operation is received and there is no need for inter-server communication. In the present embodiment, the trigger for entering batch mode execution for file creation 0820 and directory creation 0830 is when the rate of receiving those operations is greater than a pre-defined threshold.

For "get file layout" 0840 and "get file attributes" 0850 batch mode execution, there is a challenge. As the operations are requesting specific file information, the MDS 0110 would be unaware of which file information would be requested in the subsequent operations. However, after studying the typical HPC and scientific application workload, it is observed that large number of "get file layout" 0840 or "get file attributes" 0850 are received by the MDS 0110 in parallel for files under a specific directory. Hence, batch mode execution speculatively fetches corresponding file information for files under a single directory. In the present embodiment, the trigger for entering batch mode execution for "get file layout" 0840 and "get file attributes" 0850 is when the rate of receiving those operations under a specific directory is greater than a pre-defined threshold.

Another example of batch mode execution could be deletion of file or directory. In a distributed environment, deletion operation may need clean-up of related information on some other server requiring an inter-server communication. However, in batch mode execution, such operations may be locally completed on the MDS 0110 that receives the operation and a reply is sent back to the client 0130. Such processing, commonly known as asynchronous processing, may involve delayed inter-server communication. For example, after a certain number of deletions, the MDS 0110 may cumulatively perform a clean-up of all the deleted files or directories on other servers using a single network call. Batch mode execution for deletion may also need to take care of data inconsistencies across multiple servers. In the present invention, batch mode execution for file or directory deletion is not described in detail but has been mentioned here to illustrate one of many possible extensions of batch mode execution.

Figure 29:
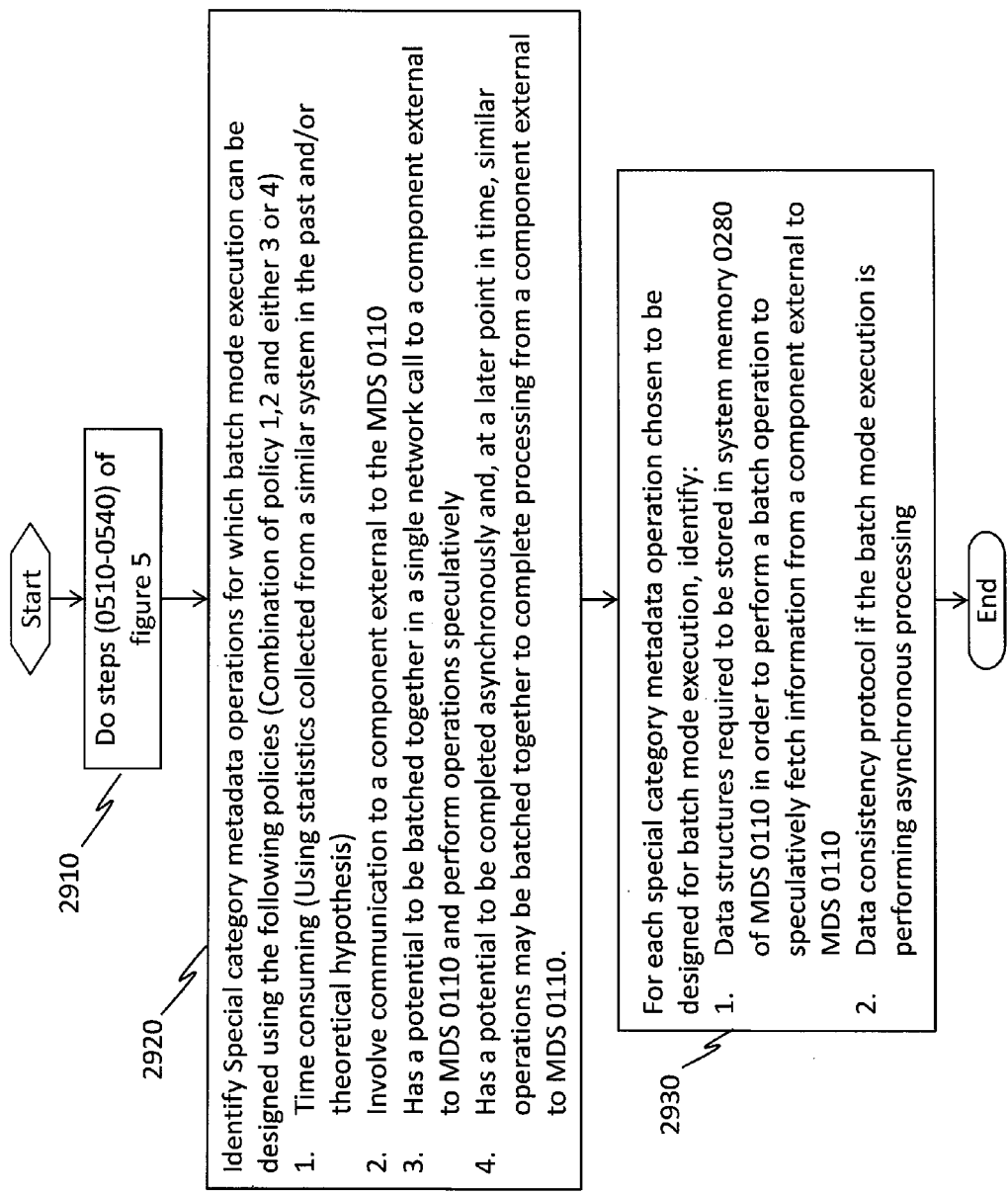
FIG. 29 is a flow diagram illustrating an exemplary set of steps to identify batch mode operation at the time of designing the MDS.

FIG. 29 is a flow diagram illustrating an exemplary set of steps to identify batch mode operation at the time of designing the MDS 0110. In step 2910, metadata operations are classified into various categories, the processing of special category of operations is split into multiple stages, and processing time for each stage is estimated using steps 0510-0540 of FIG. 5. In step 2920, certain special category operations are identified to be designed for batch mode execution based on an exemplary set of policies (this is done during the design of the MDS). In general, batch mode execution is designed for time consuming metadata operations (policy 1) involving processing from a component external to the MDS 0110 (policy 2) and which have either the potential to be batched together in a single network call to a component external to the MDS 0110 (e.g., another server or NAS or SAN device access) and perform operations speculatively (policy 3) or have the potential to be locally completed asynchronously within the MDS and, at a later point in time, to be batched together with similar operations to complete inter-server processing between the MDS 0110 and one or more external components (policy 4). It is noted that policy 1 and policy 2 are inherent in special category metadata operations. In step 2930, for selected batch mode operations, the program identifies data structures required to be stored in system memory 0280 of the MDS 0110 in order to perform a batch operation to speculatively fetch information from a component external to the MDS 0110 (if policy 3 is met in step 2920) and/or a data consistency protocol for batch mode execution involving asynchronous processing (if policy 4 is met in step 2910).

Figure 30:
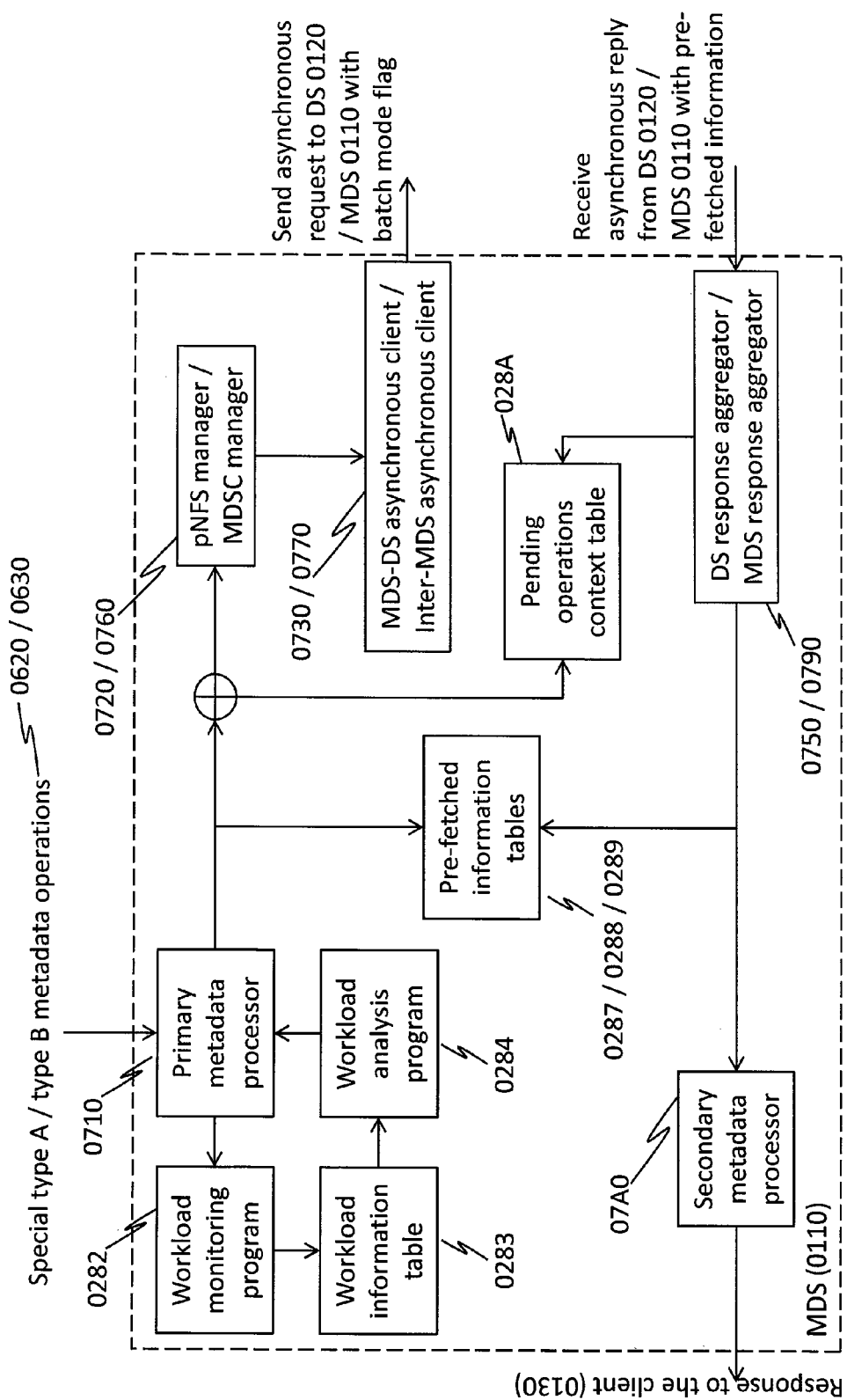
FIG. 30 is a flow diagram illustrating the exemplary steps in the processing of special type A and special type B category operations when operating in batch mode according to the second embodiment.
Figure 32:
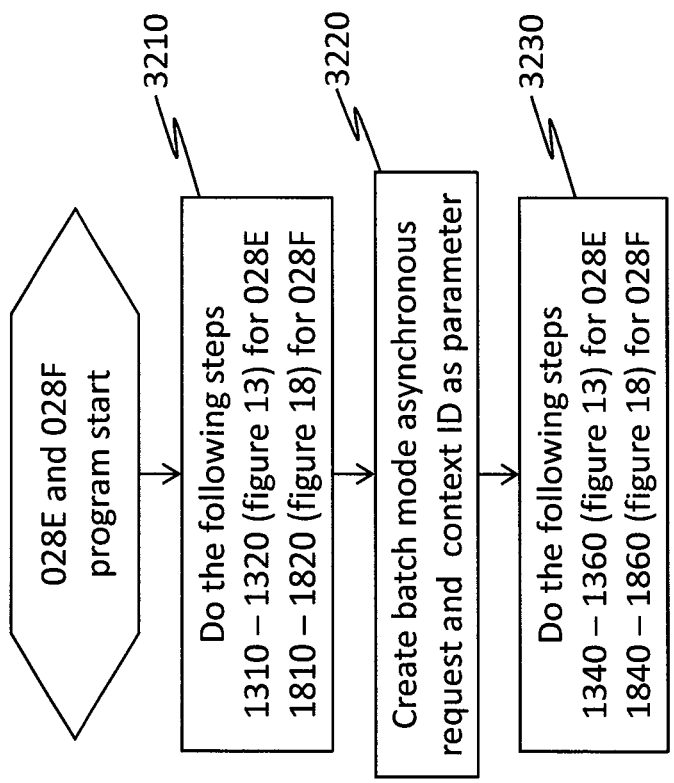
FIG. 32 is a flow diagram illustrating the exemplary steps performed by the MDS-DS asynchronous client program and inter-MDS asynchronous client program which are responsible for the MDS-DS asynchronous client stage or inter-MDS asynchronous client stage, respectively, according to the second embodiment.
Figure 33:
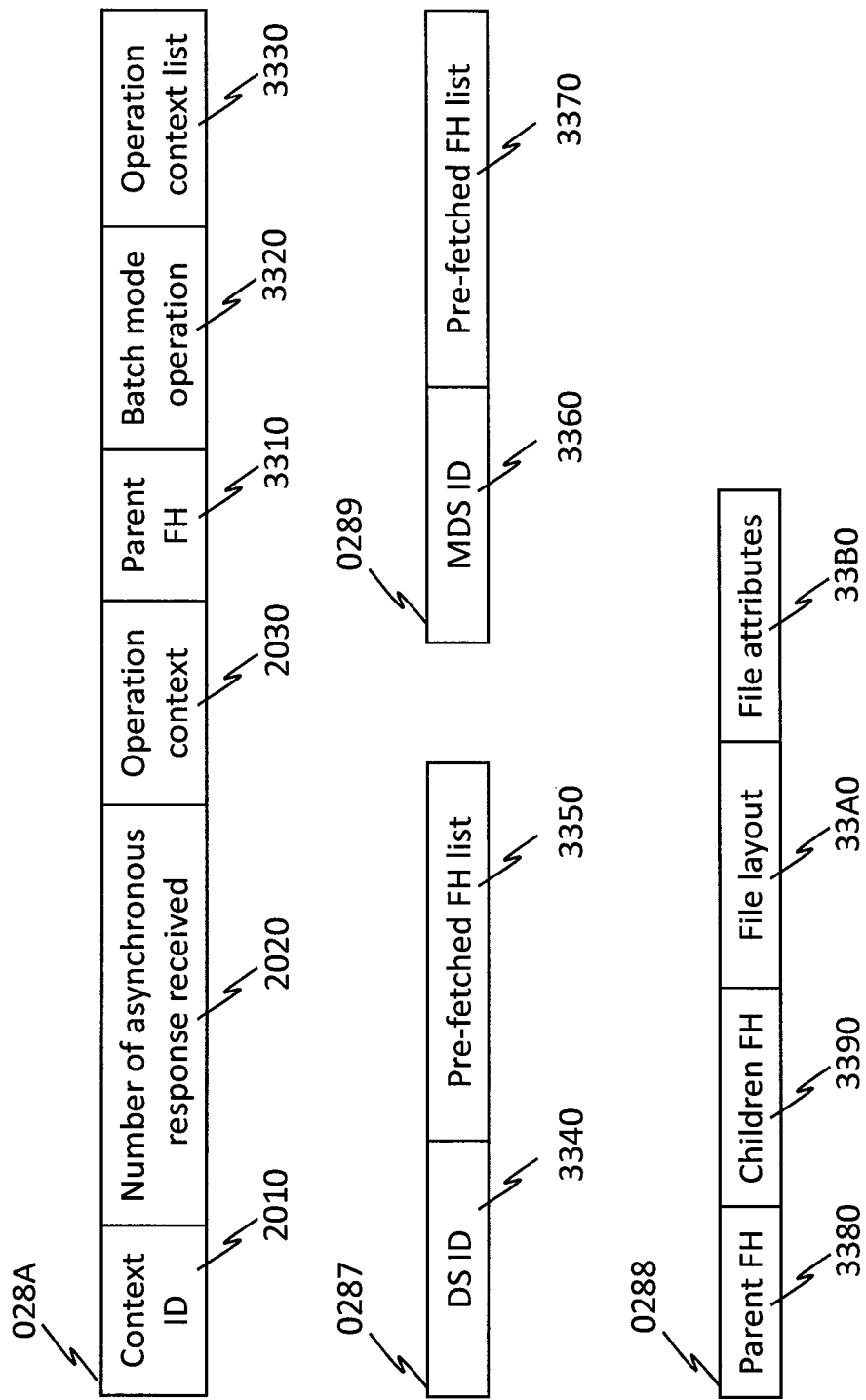
FIG. 33 depicts an exemplary set of tables required to achieve batch mode execution of selected metadata operations by following the steps described in FIG. 29.

FIG. 30 is a flow diagram illustrating the exemplary steps in the processing of special type A 0620 and special type B 0630 category operations when operating in batch mode according to the second embodiment. The workload analysis program 0284 determines whether to initiate the batch mode execution. To initiate batch mode, it sends a batch mode signal to the primary metadata processor stage 0710 along with information about batch mode operation. In the present invention, batch mode may be designed for, but is not limited to, file creation 0820, directory creation 0830, get file layout 0840, and get file attributes 0850. The primary metadata processor 0710 in the MDS 0110 receives input of special type A or type B metadata operations (0620/0630). The process flow moves through the workload monitoring program 0282, workload information table 0283 (FIG. 36), and workload analysis program 0284 (FIG. 37), and then onto separate paths (FIG. 30). One path goes to the pre-fetched information tables 0287/0288/0289 (FIG. 33). Another path goes to the pending operation context table 028A (FIG. 33). Yet another path goes to the pNFS manager stage 0720 (FIG. 12) or MDSC manager stage 0760 (FIG. 17), and the MDS-DS asynchronous client stage 0730 or inter-MDS asynchronous client stage 0770 (FIG. 32), which sends an asynchronous request to DS 0120 or MDS 0110 with batch mode flag. The DS response aggregator stage 0750 (FIG. 34) or MDS response aggregator stage 0790 (FIG. 35) receives an asynchronous reply from the DS 0120 or MDS 0110 with pre-fetched information and the process flow moves to separate paths. One path goes to the pre-fetched information tables 0287/0288/0289. Another path goes to the pending operation context table 028A. Yet another path goes to the secondary metadata processor stage 07A0 to produce a response to the client 0130.

Figure 31:
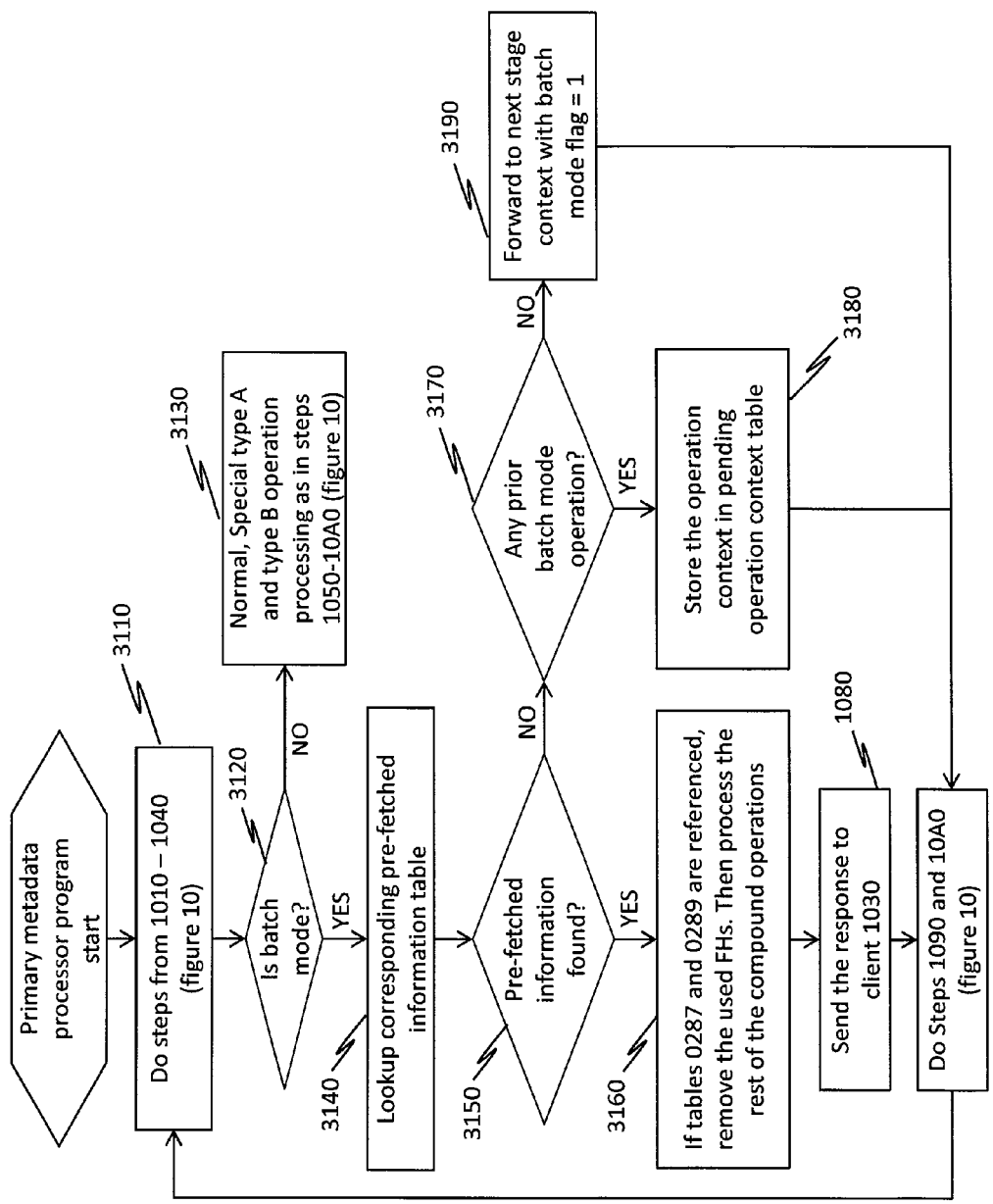
FIG. 31 is a flow diagram illustrating the exemplary steps performed by the primary metadata processor program which is responsible for primary the metadata processor stage according to the second embodiment.

FIG. 31 is a flow diagram illustrating the exemplary steps performed by the primary metadata processor program 028B which is responsible for primary the metadata processor 0710 stage according to the second embodiment. FIG. 31 is a modified version of FIG. 10. Step 3110 represents steps 1010-1040 of FIG. 10. The only difference is that for the second embodiment, in step 1040, the batch mode flag in the operation context 2030 is set to 1. In step 3120, if the result is NO for batch mode check, step 3130 is executed. Step 3130 represents steps 1050-10A0 of FIG. 10. If YES in step 3120, the program looks up corresponding pre-fetched information tables (0287, 0288, and 0289). For example, if the metadata operation is file creation 0820, the program looks up the pre-fetched DS_FH table 0287 for DS 0120 file handles for each DS 0120 under a pre-fetched FH list column 3350 (FIG. 33). For directory creation 0830, the processing is similar to file creation 0820 but is performed by referencing the pre-fetched MDS_FH table 0289. For "get file layout" 0840, the program looks up the pre-fetched metadata table 0288 for file layout information by first matching its parent FH in a parent FH column 3380 and then matching its current FH in children FH column 3390 under the corresponding parent FH row (FIG. 32). For "get file attributes" 0850, the processing is similar to "get file layout" 0840 but is performed by referencing a file attributes column under the pre-fetched metadata table 0288. In step 3150, a check is performed to verify if all the required information is found in the corresponding pre-fetched information table. If YES, the following is performed in step 3160. For file creation 0820 and directory creation 0830, the used FHs are removed from the pre-fetched DS_FH table 0287 and pre-fetched MDS_FH table 0289, respectively. For other batch mode operations, no tables are updated. After this, in the same step 3160, the rest of the compound operations are processed. Then, the following three steps 1080, 1090, and 10A0 are performed as depicted in FIG. 10.

If NO in step 3150, step 3170 is performed to check if any similar batch mode operation was already sent to further stages which would get the desired information for this operation. To make this decision, step 3170 needs to maintain a history of batch mode operations that are sent to further stages. The information that needs to be maintained depends on the operation itself. For example, if the operation is file creation 0820 or directory creation 0830, only the number of currently pre-fetched FH count is required. This number also includes the FH count that would be pre-fetched from an outstanding batch mode file creation 0820 or directory creation 0830 which was sent to further stages. If this pre-fetched file handle count is greater than a predefined threshold, then the result of step 3150 is YES; otherwise the result is NO. The threshold can be a design choice or a configurable number at the time of system deployment.

If the operation is "get file layout" 0840 or "get file attributes" 0850, more details are required. Stage 3170 needs to maintain a table containing a list of parent FHs for which the batch mode "get file layout" 0840 or "get file attributes" 0850 was initiated. The table needs to also contain, for each parent FH, a file identifier range of children whose metadata is already pre-fetched. If the current operation's parent FH is listed in this table and if the range of children that have been pre-fetched includes the current FH, then the result of step 3170 result is YES; otherwise the result is NO.

If YES in step 3170, the operation context 2030 is stored in the pending operation context table 028A in step 3180. If NO in step 3170, the operation context 2030 is sent to further processing stages depending upon the operation's category. For example, file creation 0820 and "get file layout" 0840 which belong to special type A category are sent to the pNFS manager program 028C, and directory creation 0830 and "get file attributes" 0850 which belong to special type B category are sent to the MDSC manager program 028D.

Referring back to FIG. 30, the operation context 2030 with batch mode flag set to 1 is forwarded to either the pNFS manager 0720 stage or the MDSC manager 0760 stage and then to the MDS-DS asynchronous client 0730 stage or the inter-MDS asynchronous client 0790 stage.

FIG. 32 is a flow diagram illustrating the exemplary steps performed by the MDS-DS asynchronous client program 028E and inter-MDS asynchronous client program 028F which are responsible for the MDS-DS asynchronous client 0730 stage or inter-MDS asynchronous client 0790 stage, respectively, according to the second embodiment. FIG. 32 is a modified version of FIG. 13 for the MDS-DS asynchronous client program 028E and of FIG. 18 for the inter-MDS asynchronous client program 028F, respectively. In step 3210, the MDS-DS asynchronous client program 028E performs steps 1310 and 1320 of FIG. 13. Similarly, the inter-MDS asynchronous client program 028F performs steps 1810 and 1820 of FIG. 18. In step 3220, the MDS-DS asynchronous client program 028E creates batch mode asynchronous requests to be sent to the DSs 0120 and the inter-MDS asynchronous client program 028F creates batch mode asynchronous requests to be sent to the MDSs 0110, respectively. In step 3230, the MDS-DS asynchronous client program 028E performs steps 1340 to 1360 of FIG. 13 and the inter-MDS asynchronous client program 028F performs steps 1840 to 1860 of FIG. 18, respectively.

FIG. 33 depicts an exemplary set of tables required to achieve batch mode execution of selected metadata operations by following the steps described in FIG. 29. These tables are read and written to by the primary metadata processor program 028B of FIG. 31, the DS response aggregator program 028H of FIG. 34 and the MDS response aggregator program 028I of FIG. 35. Use of each of these tables is described in the following figures. Briefly, they include the pending operation context table 028A (having columns for context ID 2010, number of asynchronous response received 2020, operation context 2030, parent FH 3310, batch mode operation 3320, and operation context list 3330), the pre-fetched DS_FH table 0287 (having columns for DS ID 3340 and pre-fetched FH list 3350), the pre-fetched MDS_FH 0289 (having columns for MDS ID 3360 and pre-fetched FH list 3370), and the pre-fetched metadata table 0288 (having columns for parent FH 3380, children FH 3390, file layout 33A0, and file attributes 33B0).

Figure 34:
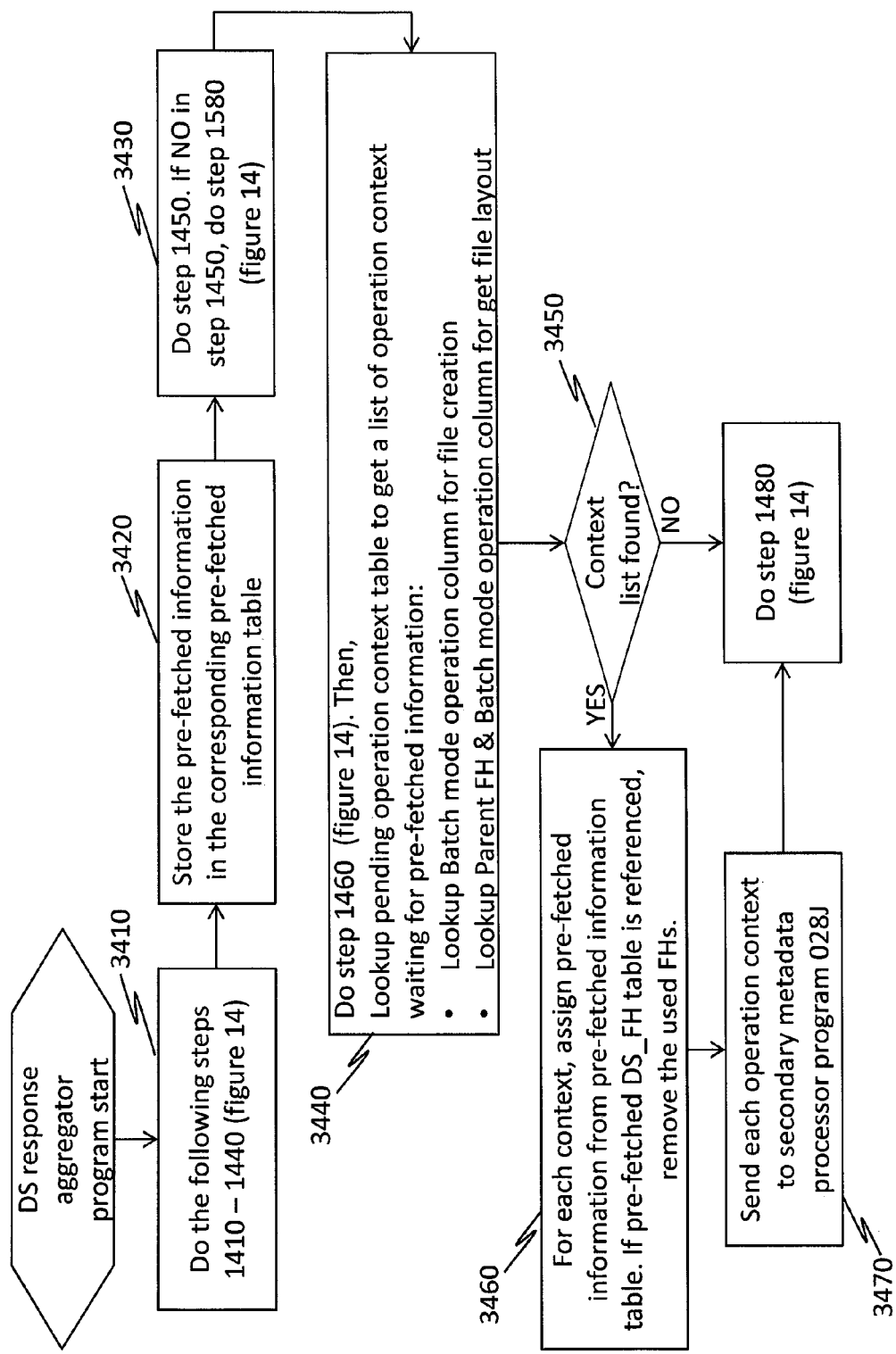
FIG. 34 is a flow diagram illustrating the exemplary steps performed by the DS response aggregator program which is responsible for DS response aggregator stage according to the second embodiment.

FIG. 34 is a flow diagram illustrating the exemplary steps performed by the DS response aggregator program 028H which is responsible for DS response aggregator 0750 stage according to the second embodiment. FIG. 34 is a modified version of FIG. 14. In step 3410, steps 1410-1440 of FIG. 14 are performed. In step 3420, the pre-fetched information from the DS response is stored in the corresponding pre-fetched information table (0287 and 0288). For example, if the metadata operation is file creation 0820, the pre-fetched DS 0120 FHs from asynchronous DS response are stored in the pre-fetched DS_FH table 0287. If the metadata operation is "get file layout" 0840, the pre-fetched file layout of sibling files (whose parent FH is the same as the parent FH of the current operation context 2030) are stored in the pre-fetched metadata table 0288. In step 3430, the program performs step 1450 of FIG. 14. If NO in step 1450, then the program performs step 1480. If YES in step 1450, the program performs step 3440. In step 3440, the program first performs step 1460 of FIG. 14 and then looks up the pending operation context table 028A to get an operation context list 3330 of those that are waiting for pre-fetched information. For example, if the metadata operation is file creation 0820, then the program finds a matching under the batch mode operation 3320 column in FIG. 33. If the metadata operation is "get file layout" 0840, then the program finds the operation context's parent FH under the parent FH 3310 column in FIG. 33.

In step 3450, if no operation context list 3330 is found, the program performs step 1480 of FIG. 14.

In step 3450, if an operation context list 3330 is found, step 3460 is performed. In step 3460, for each operation context 2030 in the operation context list 3330, pre-fetched information from the corresponding pre-fetched information tables (0287 and 0288) are assigned. For example, if the metadata operation is file creation 0820, for each operation context 2030 in the operation context list 3330, DS 0120 FHs from the pre-fetched DS_FH table 0287 are updated to the operation context's 2030 DS response data. If the metadata operation is "get file layout" 0840, for each operation context 2030 in the operation context list 3330, the pre-fetched metadata table 0288 is looked up. First the operation context's 2030 parent FH is matched in the parent FH 3380 column. Then the operation context's 2030 current FH is matched in the children FH 3390 column. Then, the corresponding file layout is assigned to the operation context's 2030 DS response data. In step 3370, each operation context 2030 in the operation context list 3330 is sent to the secondary metadata processor program 028J for further processing. Then the program performs step 1480 of FIG. 14.

Figure 35:
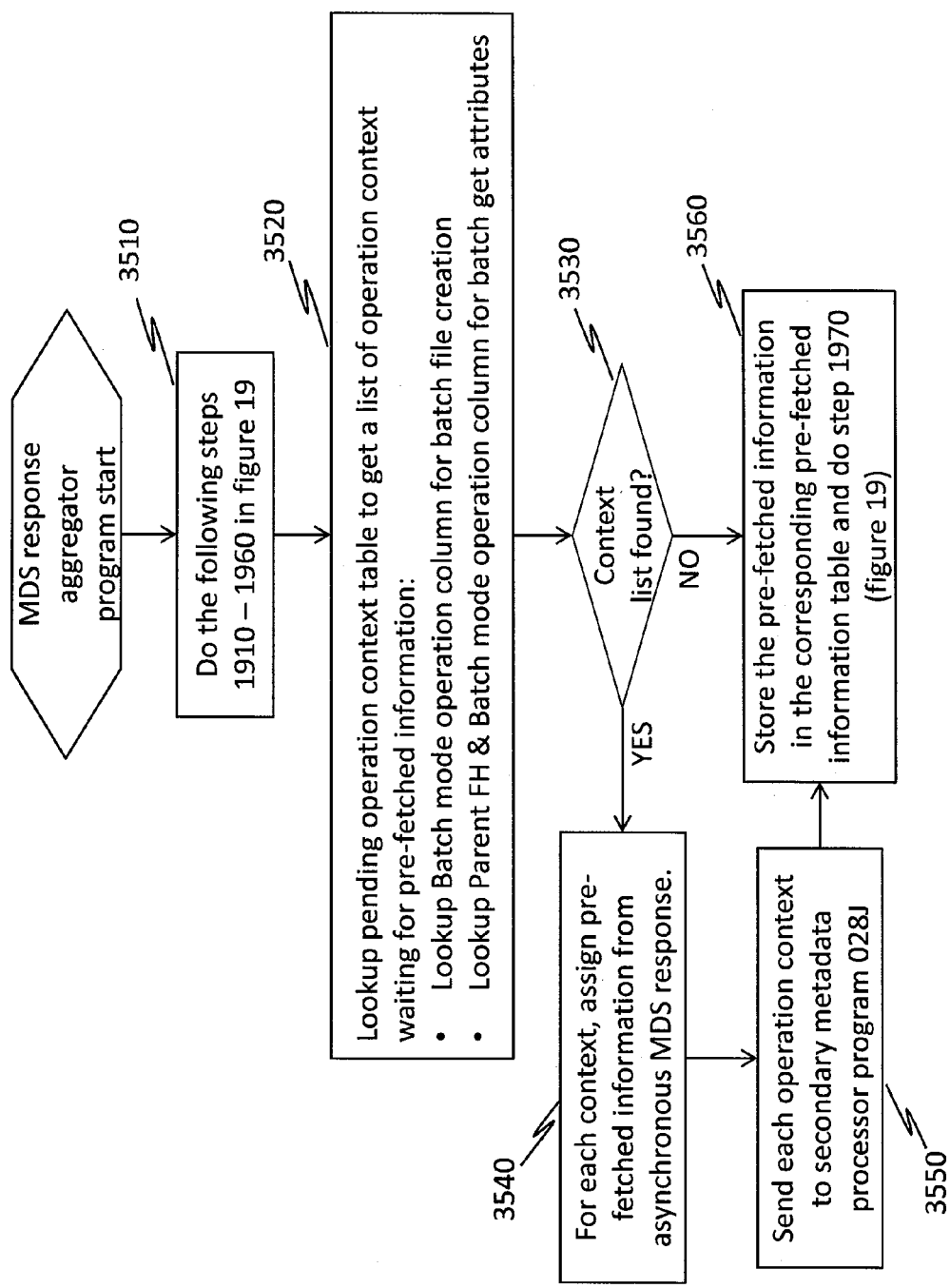
FIG. 35 is a flow diagram illustrating the exemplary steps performed by the MDS response aggregator program which is responsible for MDS response aggregator stage according to the second embodiment.

FIG. 35 is a flow diagram illustrating the exemplary steps performed by the MDS response aggregator program 028I which is responsible for MDS response aggregator 0790 stage according to the second embodiment. FIG. 35 is a modified version of FIG. 19. In step 3510, steps 1910-1960 of FIG. 19 are performed. In step 3520, the pre-fetched information from the MDS response is stored in the corresponding pre-fetched information table (0289 and 0288). For example, if the metadata operation is directory creation 0830, the pre-fetched MDS 0110 FHs from the asynchronous MDS response are stored in the pre-fetched MDS_FH table 0289. If the metadata operation is "get attributes" 0850, the pre-fetched attributes of sibling files (whose parent FH is same as the parent FH of the current operation context 2030) are stored in the pre-fetched metadata table 0288. In step 3520, the program looks up the pending operation context table 028A to get an operation context list 3330 of those that are waiting for pre-fetched information. For example, if the metadata operation is directory creation 0830, then the program finds a matching under the batch mode operation 3320 column in FIG. 33. If the metadata operation is "get file attributes" 0850, then the program finds the operation context's parent FH under the parent FH 3310 column in FIG. 33.

In step 3530, if no operation context list 3330 is found, then the program performs step 3560. In step 3460, the program stores the pre-fetched information in the corresponding pre-fetched information table (0289, 0288) and then perform step 1970 of FIG. 19.

In step 3530, if an operation context list 3330 is found, step 3540 is performed. In step 3540, for each operation context 2030 in the operation context list 3330, pre-fetched information from the asynchronous MDS response are assigned. For example, if the metadata operation is directory creation 0830, for each operation context 2030 in the operation context list 3330, MDS 0120 FH from the pre-fetched MDS_FH table 0289 is updated to operation context's 2030 MDS response data. If the metadata operation is "get file attributes" 0850, for each operation context 2030 in the operation context list 3330, the pre-fetched metadata table 0288 is looked up. First the operation context's 2030 parent FH is matched under the parent FH 3380 column. Then the operation context's 2030 current FH is matched under the children FH 3390 column. Next, the corresponding file attributes are assigned to the operation context's 2030 MDS response data. In step 3550, each operation context 2030 in the operation context list 3330 is sent to the secondary metadata processor program 028J for further processing. Then step 3560 is performed where the pre-fetched information is stored in the corresponding pre-fetched information table (0289, 0288). However, only pre-fetched FHs which are unassigned in step 3540 are stored in the pre-fetched MDS_FH table. The program then performs step 1970 of FIG. 19.

From the description of FIG. 30 to FIG. 35, one can clearly see that most operations which are in batch execution mode need to be processed only in the primary metadata processor 0710 stage. Periodically, a batch mode operation will be forwarded to further stages with batch mode flag set to 1 which will pre-fetch metadata information from the DS 0120 or some other MDSs 0110 in the anticipation that many similar metadata operations would follow. Similar metadata operations which follow will benefit from the pre-fetched metadata information.

Based on the thread allocation scheme used in first embodiment, most metadata operations which are executing in batch mode only use threads allocated to the primary metadata processor program 028B. The threads allocated to further stages are underutilized. Hence, a modified thread allocation scheme is presented in this embodiment.

FIG. 36 illustrates a modified workload information table 0283/3500 according to the second embodiment. In addition to number of normal 0610, special type A 0620, and special type B 0630 category operations, the workload monitoring program monitors and maintains a number of operations that are designed to execute in batch mode, using the column Special category metadata operation 3610. The workload monitoring program 0282 keeps the count of total metadata operations in the workload for each category in the first 3 rows of this table. In addition, it keeps the count of each batch mode operation in the subsequent rows. This may include, but is not limited to file creation 0820, directory creation 0830, get file layout 0840, and get file attributes 0850.

Figure 37:
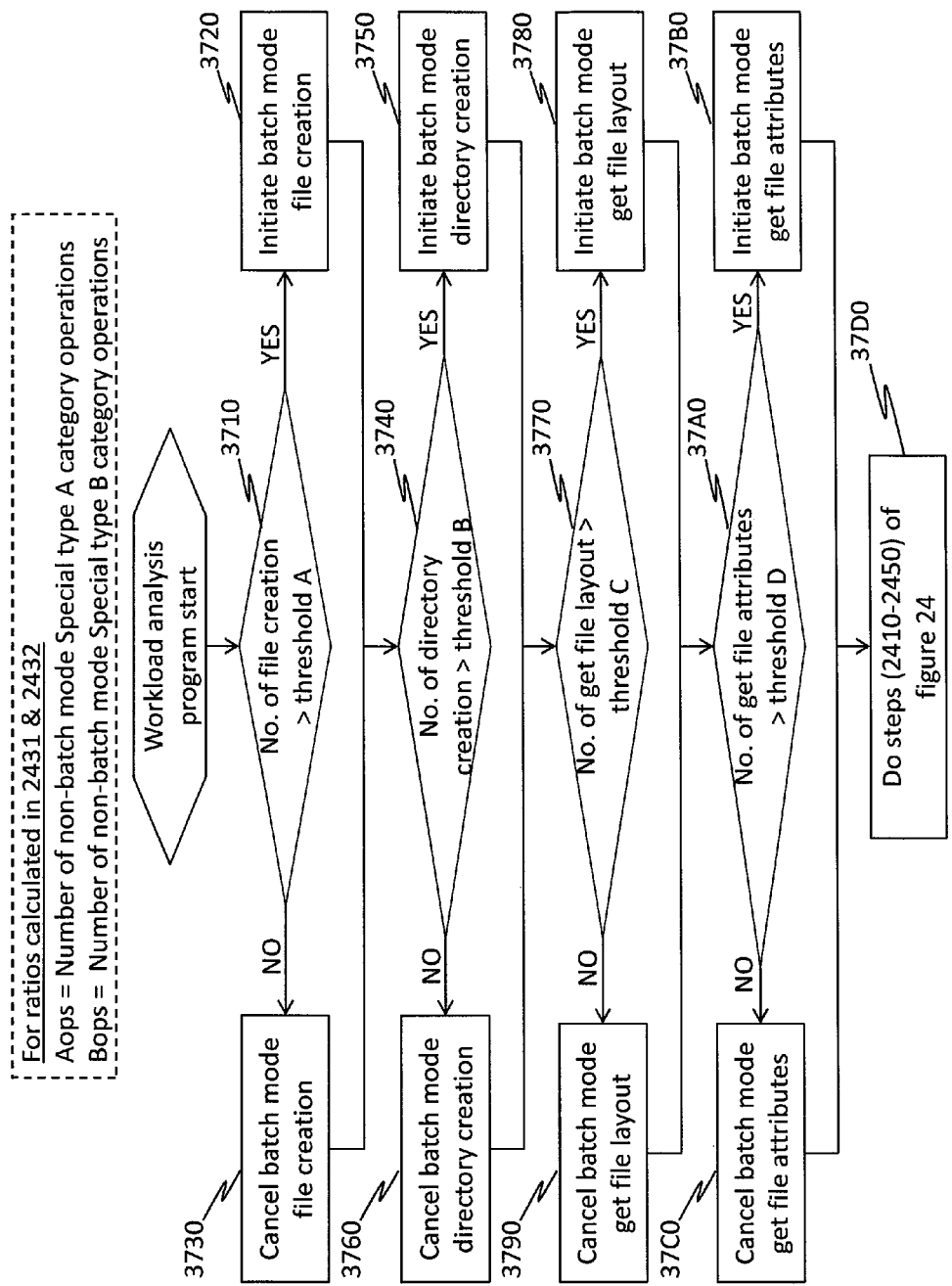
FIG. 37 illustrates a flow diagram of the exemplary steps performed by the workload analysis program to facilitate batch mode execution according to the second embodiment.

FIG. 37 illustrates a flow diagram of the exemplary steps performed by the workload analysis program 0284 to facilitate batch mode execution according to the second embodiment. Steps 3710, 3740, 3770, and 37A0 evaluate if the number of file creation 0820, directory creation 0830, get file layout 0840, and get file attributes 0850 are greater than threshold A, B, C, and D, respectively. This step is performed by looking up column 3610 in the modified workload information table 0283/3500 shown in FIG. 36. If YES, then steps 3720, 3750, 3780, and 37B0 initiate batch mode execution of corresponding metadata operation. If NO, then steps 3730, 3760, 3790, and 3700 cancel batch mode execution of corresponding metadata operation. The thresholds A, B, C, and D can be defined during the design of the MDS 0110 or can be made as a configurable parameter during system deployment.

Finally, step 37D0 is similar to steps 2410 to 2450 of FIG. 24. The only difference is that in step 2430, the ratios are calculated considering non-batch mode special category operations (i.e., the number of metadata operation for a particular special category minus the number of metadata operations for that particular special category which have been selected to be executed in batch mode). The reason for this change is that, operations that are executing in batch mode complete processing in the primary metadata processor 0710 stage itself (excluding an infrequent, speculatively executing batch operation). In other words, this change enforces the thread allocation scheme to consider operations executing in batch mode as a normal category operation. This scheme of thread allocation makes full use of otherwise underutilized threads in stages 0720, 0730, 0750, 0760, 0770, 0790, and 07A0 dedicated for batch mode operations of special type A and type B categories. This thread allocation scheme improves the performance of batch mode operations and normal category operations significantly.

Embodiment 3

The description of a third embodiment of the present invention will mainly focus on the differences from the previous embodiments.

In the first embodiment, clients 0130 first access the metadata from MDSs 0110 and then file contents directly from DSs 0120. In other words, MDSs 0110 are not participating in the file content access path. However, a client 0130 may not have the capability to differentiate the process of metadata access and file contents access, i.e., to send metadata operations to MDSs 0110 and send file content operations to DSs 0120. Instead, a client 0130 may send both metadata operations and file content operations to MDSs 0110. Therefore, in the third embodiment, the MDSs 0110 will serve both metadata access and file content access from clients 0130.

Figure 38:
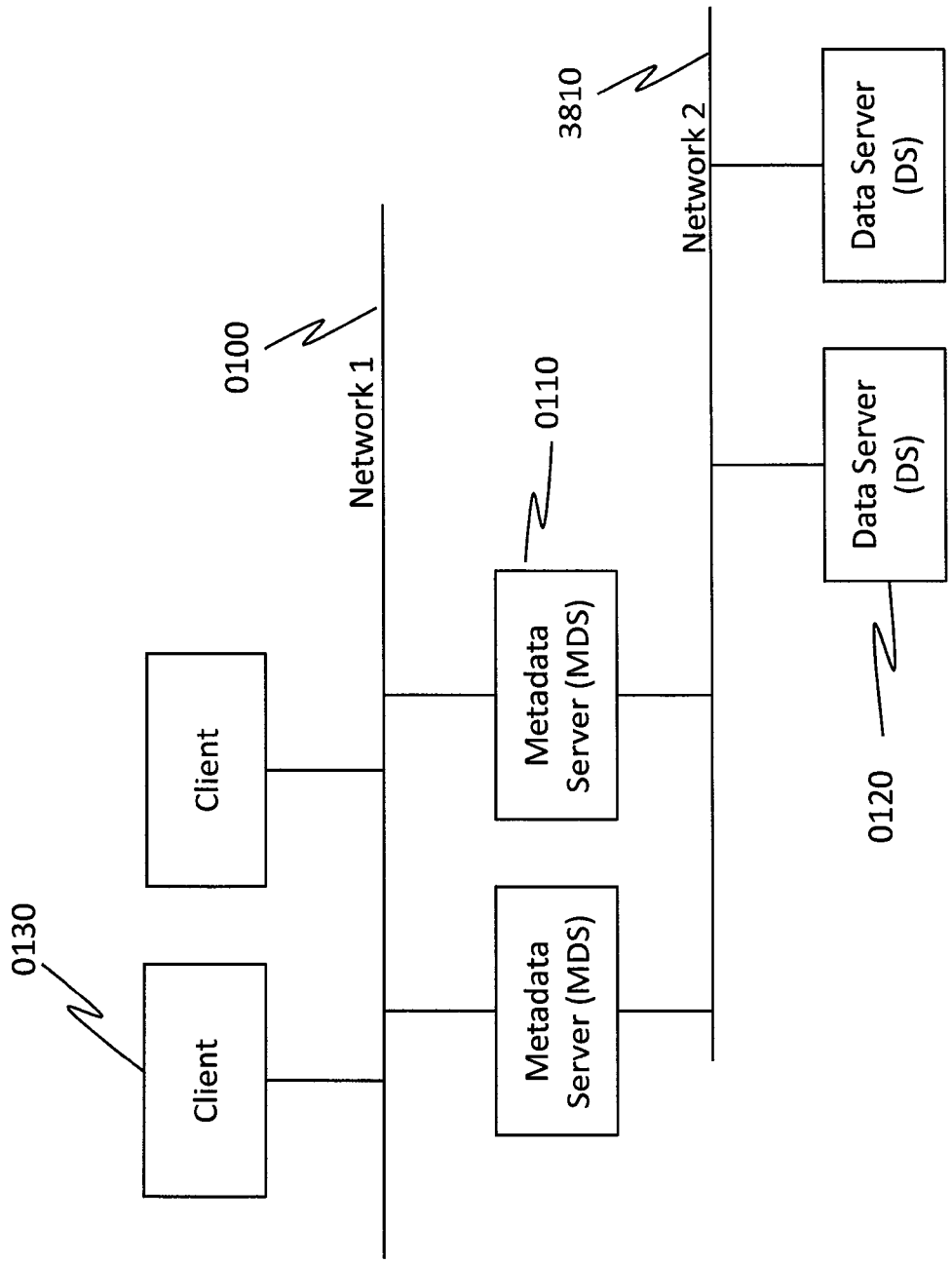
FIG. 38 is an exemplary diagram of an overall system in which the method and apparatus of the invention may be applied according to the third embodiment of the invention.

FIG. 38 is an exemplary diagram of an overall system in which the method and apparatus of the invention may be applied according to the third embodiment of the invention. The system includes a plurality of Metadata Servers (MDSs) 0110, Data Servers (DSs) 0120, and Clients 0130. Clients 0130 and MDSs 0110 are connected to a network 1 0100. MDSs 0110 and DSs 0120 are connected to a network 2 3810. Clients 0130 access both the metadata and file contents from MDSs 0110 through network 1 0100. For metadata access, MDSs 0110 will serve the requests as described in the first embodiment. For file contents access, if the access involves read operation, the MDSs 0110 will retrieve file contents from DSs 0120 through network 2 3810, and send back file contents to clients 0130 through network 1 0100. On the other hand, if the access involves write operation, the MDSs 0110 will receive the file contents from clients 0130 through network 1 0100, and store the file contents to DSs 0120 through network 2 3810.

Embodiment 4

The description of a fourth embodiment of the present invention will mainly focus on the differences from the previous embodiments.

In the above described embodiments, an MDS 0110 maintains location information of file contents 0252, and a Client 0130 uses the location information to access file contents 0351 stored in DSs 0120 through NFS protocol module 0420. In the fourth embodiment, a MDS 0110, a DS 0120, and a Client 0130 can also be equipped with a block-access protocol module, such as iSCSI (Internet Small Computer System Interface) and FCOE (Fibre Channel over Ethernet). An MDS 0110 can store location information of file contents in such a way that a Client 0130 can access file contents via either NFS protocol module or block-access protocol module.

Of course, the system configurations illustrated in FIGS. 1 and 38 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for improving server resource utilization and performance of metadata operations. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. An MDS (metadata server) in a distributed storage system which includes a plurality of data servers (DSs) storing file contents and one or more MDSs performing a plurality of metadata operations in response to metadata requests of different types, the MDS including a controller having a processor and a memory, the MDS storing file system metadata, the controller being configured to:

classify the metadata operations into different categories, which include a normal category and one or more special categories which are different from the normal category, the normal category having a primary stage which does not involve communication between the MDS and a component external to the MDS;

for each of the one or more special categories, partition each of the metadata operations into a plurality of stages at least one of which involves communication between the MDS and a component external to the MDS; and dynamically assign resources to each of the partitioned stage based on monitored workloads of the different types of metadata requests;

wherein dynamically assigning resources comprises:

monitoring metadata workload of the normal category and the one or more special categories to obtain a number of metadata operations for each category and a total number of metadata operations for all categories;

calculating, for each special category, a ratio of the number of metadata operations for said each special category to the total number of metadata operations for all categories obtained from the monitoring;

calculating a processing time for each of the normal category and the one or more special categories; and allocating a plurality of threads representing units of execution across all the stages by considering: (i) an estimated processing time for each stage, (ii) the calculated ratio for each special category, (iii) the calculated processing time for each category, and (iv) a total number of threads allocated to the MDS.

2. The MDS of claim 1,
wherein the classifying comprises classifying the metadata operations into different categories based on type and amount of processing required for each category.

3. The MDS of claim 1,
wherein the one or more special categories of metadata operations comprise at least one of (i) a first special category of metadata operations that require communication between the MDS and one or more of the plurality of DSs; or (ii) a second special category of metadata operations that require communication between the MDS and one or more other MDSs.

4. The MDS of claim 3,
wherein the stages for the first special category of metadata operations comprise the primary stage; and
a pNFS manager stage for performing pNFS related metadata management including preparing requests to be sent to the DSs;
an MDS-DS asynchronous client stage for sending asynchronous requests to the DSs;
an asynchronous DS processing stage which is performed on the DSs for processing asynchronous requests from the MDS and sending a response back to the MDS after processing completes;
a DS response aggregator stage for receiving responses from the DSs and aggregating all the received responses to a single context representing a corresponding metadata operation; and
a secondary metadata processor stage for post processing on the MDS; and
wherein the stages for the second special category of metadata operations comprise the primary stage;
an MDSC manager stage for performing MDS cluster management including preparing requests to be sent to the one or more other MDSs;
an inter-MDS asynchronous client stage for sending asynchronous requests to the one or more other MDSs;
an asynchronous inter-MDS processing stage which is performed on the one or more other MDSs;
an MDS response aggregator stage for receiving responses from the plurality of MDSs and aggregating all the received responses to a single context representing a corresponding metadata operation; and
a secondary metadata processor stage for post processing on the MDS.

5. The MDS of claim 1,
wherein the partitioning comprises partitioning each metadata operation into a plurality of stages each of which (i) involves communication with a component external to the MDS, or (ii) involves a processing logic that is modularly different from its preceding processing logic and its succeeding processing logic.

6. The MDS of claim 5,
wherein a stage which involves communication with a component external to the MDS has a processing logic that treats the external component with which the stage of the metadata operation communicates as an asynchronous server component.

7. The MDS of claim 1,
wherein the threads allocated to a particular special category are assigned to each stage involved in the particular special category in the ratio of the estimated processing time of each stage relative to the processing time of all the stages of the particular special category.

8. An MDS (metadata server) in a distributed storage system which includes a plurality of data servers (DSs) storing file contents and one or more MDSs performing a plurality of metadata operations in response to metadata requests of different types, the MDS including a controller having a processor and a memory, the MDS storing file system metadata, the controller being configured to:
classify the metadata operations into different categories, which include a normal category and one or more special categories which are different from the normal category, the normal category having a primary stage which does not involve communication between the MDS and a component external to the MDS;
for each of the one or more special categories, partition each of the metadata operations into a plurality of stages at least one of which involves communication between the MDS and a component external to the MDS;
dynamically assign resources to each of the partitioned stage based on monitored workloads of the different types of metadata requests; and
identify, from the one or more special categories of metadata operations, one or more candidate metadata operations to be executed in batch mode;
wherein the one or more candidate metadata operations each (i) has a potential to be batched together in a single network call to perform similar metadata operations speculatively, or (ii) has a potential to be locally completed asynchronously within the MDS and, at a later point in time, to be batched together with similar metadata operations to complete inter-server processing between the MDS and one or more external components.

9. The MDS of claim 8, wherein the controller is configured:
(i) when the one or more candidate metadata operations each has a potential to be batched together in a single network call to perform similar metadata operations speculatively, to identify data structures required to be stored in the memory of the MDS in order to perform a batch operation to speculatively fetch information from the external component; or
(ii) when the one or more candidate metadata operations each has a potential to be locally completed asynchronously within the MDS and, at a later point in time, to be batched together with similar metadata operations to complete inter-server processing between the MDS and one or more external components, to identify a data consistency protocol for batch mode execution involving asynchronous processing.

10. The MDS of claim 8, wherein the controller is configured to:
count a total number of each candidate metadata operation to be executed in batch mode based on monitoring the metadata workload; and when the total number of a particular candidate metadata operation exceeds a preset threshold for the particular candidate metadata operation, select the particular candidate metadata operation to be executed in batch mode.

11. The MDS of claim 10, wherein the dynamically assigning resources comprises:
monitoring metadata workload of the normal category and the one or more special categories to obtain a number of metadata operations for each category and a total number of metadata operations for all categories;
calculating, for each special category, a ratio of (the number of metadata operations for said each special category minus a number of metadata operations for said each special category which have been selected to be executed in batch mode) to the total number of metadata operations for all categories obtained from the monitoring;
calculating a processing time for each of the normal category and the one or more special categories; and
allocating a plurality of threads representing units of execution across all the stages by considering: (i) an estimated processing time for each stage, (ii) the calculated ratio for each special category, (iii) the calculated processing time for each category, and (iv) a total number of threads allocated to the MDS.

12. The MDS of claim 8,
wherein the partitioning comprises partitioning each metadata operation into a plurality of stages each of which (i) involves communication with a component external to the MDS, or (ii) involves a processing logic that is modularly different from its preceding processing logic and its succeeding processing logic.

13. The MDS of claim 12,
wherein a stage which involves communication with a component external to the MDS has a processing logic that treats the external component with which the stage of the metadata operation communicates as an asynchronous server component.

14. The MDS of claim 8,
wherein the threads allocated to a particular special category are assigned to each stage involved in the particular special category in the ratio of the estimated processing time of each stage relative to the processing time of all the stages of the particular special category.

15. A method of managing resources of an MDS (metadata server) in a distributed storage system which includes a plurality of data servers (DSs) storing file contents and one or more MDSs performing a plurality of metadata operations in response to metadata requests of different types, the MDS including a controller having a processor and a memory, the MDS storing file system metadata, the method comprising:
classifying the metadata operations into different categories, which include a normal category and one or more special categories which are different from the normal category, the normal category having a primary stage which does not involve communication between the MDS and a component external to the MDS;
for each of the one or more special categories, partitioning each of the metadata operations into a plurality of stages at least one of which involves communication between the MDS and a component external to the MDS; and
dynamically assigning resources to each of the partitioned stage based on monitored workloads of the different types of metadata requests
wherein dynamically assigning resources comprises:
monitoring metadata workload of the normal category and the one or more special categories to obtain a number of metadata operations for each category and a total number of metadata operations for all categories;
calculating, for each special category, a ratio of the number of metadata operations for said each special category to the total number of metadata operations for all categories obtained from the monitoring;
calculating a processing time for each of the normal category and the one or more special categories; and
allocating a plurality of threads representing units of execution across all the stages by considering: (i) an estimated processing time for each stage, (ii) the calculated ratio for each special category, (iii) the calculated processing time for each category, and (iv) a total number of threads allocated to the MDS.

16. The method of claim 15, further comprising:
identifying, from the one or more special categories of metadata operations, one or more candidate metadata operations to be executed in batch mode, wherein the one or more candidate metadata operations each (i) has a potential to be batched together in a single network call to perform similar metadata operations speculatively, or (ii) has a potential to be locally completed asynchronously within the MDS and, at a later point in time, to be batched together with similar metadata operations to complete inter-server processing between the MDS and one or more external components;
counting a total number of each candidate metadata operation to be executed in batch mode based on monitoring the metadata workload; and
when the total number of a particular candidate metadata operation exceeds a preset threshold for the particular candidate metadata, selecting the particular candidate metadata operation to be executed in batch mode;
wherein dynamically assigning resources comprises:
monitoring metadata workload of the normal category and the one or more special categories to obtain a number of metadata operations for each category and a total number of metadata operations for all categories;
calculating, for each special category, a ratio of (the number of metadata operations for said each special category minus a number of metadata operations for said each special category which have been selected to be executed in batch mode) to the total number of metadata operations for all categories obtained from the monitoring;
calculating a processing time for each of the normal category and the one or more special categories; and
allocating a plurality of threads representing units of execution across all the stages by considering: (i) an estimated processing time for each stage, (ii) the calculated ratio for each special category, (iii) the calculated processing time for each category, and (iv) a total number of threads allocated to the MDS.

17. The method of claim 15,
wherein the one or more special categories of metadata operations comprise at least one of (i) a first special category of metadata operations that require communication between the MDS and one or more of the plurality of DSs; or (ii) a second special category of metadata operations that require communication between the MDS and one or more other MDSs;
wherein the stages for the first special category of metadata operations comprise the primary stage; a pNFS manager stage for performing pNFS related metadata management including preparing requests to be sent to the DSs; an MDS-DS asynchronous client stage for sending asynchronous requests to the DSs; an asynchronous DS processing stage which is performed on the DSs for processing asynchronous requests from the MDS and sending a response back to the MDS after processing completes; a DS response aggregator stage for receiving responses from the DSs and aggregating all the received responses to a single context representing a corresponding metadata operation; and a secondary metadata processor stage for post processing on the MDS; and wherein the stages for the second special category of metadata operations comprise the primary stage; an MDSC manager stage for performing MDS cluster management including preparing requests to be sent to the one or more other MDSs; an inter-MDS asynchronous client stage for sending asynchronous requests to the one or more other MDSs; an asynchronous inter-MDS processing stage which is performed on the one or more other MDSs; an MDS response aggregator stage for receiving responses from the plurality of MDSs and aggregating all the received responses to a single context representing a corresponding metadata operation; and a secondary metadata processor stage for post processing on the MDS.

18. The method of claim 15, wherein partitioning comprises partitioning each metadata operation into a plurality of stages each of which (i) involves communication with a component external to the MDS, or (ii) involves a processing logic that is modularly different from its preceding processing logic and its succeeding processing logic.

19. The MDS of claim 18, wherein a stage which involves communication with a component external to the MDS has a processing logic that treats the external component with which the stage of the metadata operation communicates as an asynchronous server component.

20. The method of claim 15, wherein the threads allocated to a particular special category are assigned to each stage involved in the particular special category in the ratio of the estimated processing time of each stage relative to the processing time of all the stages of the particular special category.

* * * * *